(12) United States Patent
Minor (10) Patent No.: US 8,024,937 B2
(45) Date of Patent: Sep. 27, 2011

(54) METHOD FOR LEAK DETECTION IN HEAT TRANSFER SYSTEMS

(75) Inventor: Barbara Haviland Minor, Elkton, MD (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 419 days.

(21) Appl. No.: 12/143,107

(22) Filed: Jun. 20, 2008

(65) Prior Publication Data

US 2008/0314073 A1    Dec. 25, 2008

Related U.S. Application Data

(60) Provisional application No. 60/945,469, filed on Jun. 21, 2007.

(51) Int. Cl.
*F25B 1/00* (2006.01)

(52) U.S. Cl. ............................ 62/115; 62/149

(58) Field of Classification Search .............. 62/115, 62/77, 127, 129, 149, 225, 272, 498; 73/40.5 R, 73/54.06
See application file for complete search history.

(56) References Cited

U.S. PATENT DOCUMENTS

| | | | | |
|---|---|---|---|---|
| 4,766,735 A * | 8/1988 | Gotou | ............... | 62/175 |
| 4,864,829 A * | 9/1989 | Manning et al. | ............... | 62/85 |
| 5,650,089 A | 7/1997 | Gage et al. | | |
| 5,983,657 A | 11/1999 | Murata et al. | | |
| 6,066,768 A | 5/2000 | Nappa et al. | | |
| 6,293,138 B1 * | 9/2001 | Konieczny et al. | ............. | 73/40.7 |
| 6,854,285 B2 * | 2/2005 | Jessen | ............... | 62/225 |
| 7,493,775 B2 * | 2/2009 | Shimamoto et al. | ............. | 62/199 |
| 7,569,170 B2 | 8/2009 | Minor | | |
| 7,752,855 B2 * | 7/2010 | Matsuoka et al. | ............... | 62/149 |
| 2004/0068999 A1 | 4/2004 | Jessen | | |
| 2006/0254294 A1 * | 11/2006 | Shimamoto et al. | ........ | 62/238.7 |
| 2007/0089434 A1 | 4/2007 | Singh et al. | | |
| 2007/0175240 A1 * | 8/2007 | Jager | ............................... | 62/612 |
| 2009/0249809 A1 | 10/2009 | Minor et al. | | |
| 2009/0249864 A1 | 10/2009 | Minor et al. | | |
| 2009/0250650 A1 | 10/2009 | Minor et al. | | |
| 2009/0255285 A1 | 10/2009 | Minor et al. | | |
| 2009/0272931 A1 | 11/2009 | Minor et al. | | |
| 2009/0277194 A1 | 11/2009 | Minor et al. | | |
| 2009/0278072 A1 | 11/2009 | Minor et al. | | |

FOREIGN PATENT DOCUMENTS

| | | |
|---|---|---|
| DE | 3913521 A | 10/1990 |
| DE | 3913521 A1 | 10/1990 |
| EP | 1022552 A | 7/2000 |
| JP | 2004110388 A | 4/1992 |

(Continued)

OTHER PUBLICATIONS

The International Search Report; dated Oct. 22, 2008.

(Continued)

*Primary Examiner* — Mohammad Ali (57) ABSTRACT

Disclosed is a method for detecting a leak in a closed loop heat transfer system comprising monitoring the pressure of the heat transfer composition inside said heat transfer system, wherein a drop in pressure indicates a leak. Also disclosed is a heat transfer system comprising an evaporator, a compressor, a condenser, an expander and a device for measuring internal system pressure. The system pressure measuring device is disposed inside the closed loop heat system. The internal system pressure measuring means may be located either between the evaporator and the condenser, between the expander and the evaporator, between the compressor and the condenser, or between the condenser and the expander.

15 Claims, 1 Drawing Sheet

FOREIGN PATENT DOCUMENTS

| | | | |
|---|---|---|---|
| JP | 2003161551 | A | 6/2003 |
| RU | 2073058 | C1 | 2/1997 |
| WO | 2005119197 | A | 12/2005 |
| WO | 2006/094303 | A2 | 9/2006 |
| WO | 2007/126414 | A2 | 11/2007 |
| WO | 2007126760 | A3 | 11/2007 |
| WO | 2008027555 | A2 | 3/2008 |

OTHER PUBLICATIONS

Written Opinion of the International Searching Authority; dated Oct. 22, 2008.

Jeanneaux et al., Journal of Fluorine Chemistry, vol. 4, pp. 261-270, 1974.

Jeanneaux et al., Journal of Fluorine Chemistry, vol. 4, pp. 261-270, 1974.

* cited by examiner

FIG. 1

METHOD FOR LEAK DETECTION IN HEAT TRANSFER SYSTEMS

CROSS REFERENCE(S) TO RELATED APPLICATION

This application claims the priority benefit of U.S. Provisional Application No. 60/945,469, filed Jun. 21, 2007.

BACKGROUND OF THE INVENTION

1. Field of the Invention

The present disclosure relates to a method of detecting a leak of a heat transfer composition from a closed loop heat transfer system. In particular, it relates to locating a pressure monitoring device inside the closed loop system for monitoring pressure changes inside the system to indicate a leak.

2. Description of Related Art

Currently used heat transfer compositions for mobile and stationary refrigeration, air conditioning, and heat pump systems comprise single component compositions. Most commonly hydrofluorocarbons, such as 1,1,1,2-tetrafluoroethane (HFC-134a), are used as the heat transfer compositions in such systems. Leaks of hydrofluorocarbon from a system are generally only detected when the system fails to operate properly, e.g. an air conditioner that no longer provides cooling. This causes large amounts of heat transfer composition to be released to the environment and results in essentially a complete break-down of the system prior to detection of a leak. Early detection of a leak would be advantageous in reducing emissions and providing more reliable cooling performance.

Certain multi-component mixtures have been proposed or are being used as replacement heat transfer compositions. For some of these compositions, especially where a leak produces a significant pressure change in a heat transfer system, a new method for early detection of leaks is desirable.

SUMMARY OF THE INVENTION

The present disclosure provides a method for detecting a leak of a heat transfer composition in a closed loop heat transfer system comprising monitoring the pressure of the heat transfer composition with a pressure monitoring device disposed inside said closed loop heat transfer system, wherein a drop in pressure indicates a leak.

Such a method is particularly useful for detecting leaks of non-azeotropic heat transfer compositions, where a leak will produce a significant pressure change. This is because a non-azeotropic composition fractionates during evaporation or boiling off. During leaking from a heat transfer system this fractionation will cause the lower boiling (or higher vapor pressure) component to leak out of the apparatus first. Thus, the vapor pressure of the heat transfer composition remaining inside the heat transfer system will be reduced. This drop in pressure can be measured and used as an early indication of a leak.

The present disclosure further comprises a heat transfer system comprising a compressor, a condenser, an expander, and an evaporator, and a pressure measuring device disposed inside the closed loop system for measuring the internal pressure of the system. A drop in pressure is indicative of a leak in the system. In one embodiment, the pressure measuring device may be located in the connecting line, or tubing, between the evaporator and the compressor, or in any of the connecting lines between the various elements of the system.

The foregoing general description and the following detailed description are exemplary and explanatory only and are not restrictive of the invention, as defined in the appended claims.

DETAILED DESCRIPTION OF THE INVENTION

The present disclosure generally provides a method for detecting a leak of heat transfer composition in a closed loop heat transfer system, and a closed loop heat transfer system comprising a pressure measuring device for measuring the internal pressure of such a system.

Definitions and Clarification of Terms

Before addressing details of embodiments described below, some terms are defined or clarified.

As used herein, an azeotropic composition comprises a constant-boiling mixture of two or more substances that behave as a single substance. One way to characterize an azeotropic composition is that the vapor produced by partial evaporation or distillation of the liquid has the same composition as the liquid from which it is evaporated or distilled, i.e., the mixture distills/refluxes without compositional change. Constant-boiling compositions are characterized as azeotropic because they exhibit either a maximum or minimum boiling point, as compared with that of the non-azeotropic mixture of the same compounds. An azeotropic composition will not fractionate within a heat transfer system during operation, which may reduce efficiency of the system. Additionally, an azeotropic composition will not fractionate upon leakage from a heat transfer system.

As used herein, a near-azeotropic composition (also commonly referred to as an "azeotrope-like composition") comprises a substantially constant boiling liquid admixture of two or more substances that behaves similarly to a single substance. One way to characterize a near-azeotropic composition is that the vapor produced by partial evaporation or distillation of the liquid has substantially the same composition as the liquid from which it was evaporated or distilled, that is, the admixture distills/refluxes without substantial composition change. Another way to characterize a near-azeotropic composition is that the bubble point vapor pressure and the dew point vapor pressure of the composition at a particular temperature are substantially the same. As used herein, a composition is near-azeotropic if, after 50 weight percent of the composition is removed, such as by evaporation or boiling off, the difference in vapor pressure between the original composition and the composition remaining after 50 weight percent of the original composition has been removed is less than about 10 percent.

As used herein, a non-azeotropic composition (also commonly referred to as a zeotropic composition) comprises one that is not azeotropic and also not near-azeotropic, meaning that it behaves as a simple mixture of components and thus will fractionate during evaporation or boiling off. During leakage from a heat transfer system this fractionation will cause the lower boiling (higher vapor pressure) component to leak out of the apparatus first. Thus, the vapor pressure of the heat transfer composition remaining inside the heat transfer system will be reduced. This drop in pressure can be measured and used as an early indication of a leak.

As used herein, a heat transfer system may be any refrigeration system, refrigerator, air conditioning system, air conditioner, heat pump, chiller, and the like utilizing a heat transfer composition.

As used herein, a heat transfer composition comprises a composition used to carry heat from a heat source to a heat sink.

As used herein, a refrigerant comprises a compound or mixture of compounds that function as a heat transfer composition in a cycle wherein the composition undergoes a phase change from a liquid to a gas and back.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

Heat Transfer Compositions

The heat transfer composition used in the method or the system of the present invention may comprise at least one compound selected from the group consisting of hydrofluorocarbons, fluoroethers, fluoroolefins, hydrocarbons, $CF_3I$, $NH_3$, $CO_2$, and mixtures thereof, meaning mixtures of any of the foregoing compounds. In one particular embodiment, the heat transfer composition of the present invention may comprise at least one hydrofluorocarbon and at least one fluoroolefin.

Hydrofluorocarbons comprise at least one saturated compound containing carbon, hydrogen, and fluorine. Of particular utility are hydrofluorocarbons having 1-7 carbon atoms and having a normal boiling point of from about −90° C. to about 80° C. Hydrofluorocarbons are commercial products available from a number of sources or may be prepared by methods known in the art. Representative hydrofluorocarbon compounds include but are not limited to fluoromethane ($CH_3F$, HFC-41), difluoromethane ($CH_2F_2$, HFC-32), trifluoromethane ($CHF_3$, HFC-23), pentafluoroethane ($CF_3CHF_2$, HFC-125), 1,1,2,2-tetrafluoroethane ($CHF_2CHF_2$, HFC-134), 1,1,1,2-tetrafluoroethane ($CF_3CH_2F$, HFC-134a), 1,1,1-trifluoroethane ($CF_3CH_3$, HFC-143a), 1,1-difluoroethane ($CHF_2CH_3$, HFC-152a), fluoroethane ($CH_3CH_2F$, HFC-161), 1,1,1,2,2,3,3-heptafluoropropane ($CF_3CF_2CHF_2$, HFC-227ca), 1,1,1,2,3,3,3-heptafluoropropane ($CF_3CHFCF_3$, HFC-227ea), 1,1,2,2,3,3,-hexafluoropropane ($CHF_2CF_2CHF_2$, HFC-236ca), 1,1,1,2,2,3-hexafluoropropane ($CF_3CF_2CH_2F$, HFC-236cb), 1,1,1,2,3,3-hexafluoropropane ($CF_3CHFCHF_2$, HFC-236ea), 1,1,1,3,3,3-hexafluoropropane ($CF_3CH_2CF_3$, HFC-236fa), 1,1,2,2,3-pentafluoropropane ($CHF_2CF_2CH_2F$, HFC-245ca), 1,1,1,2,2-pentafluoropropane ($CF_3CF_2CH_3$, HFC-245cb), 1,1,2,3,3-pentafluoropropane ($CHF_2CHFCHF_2$, HFC-245ea), 1,1,1,2,3-pentafluoropropane ($CF_3CHFCH_2F$, HFC-245eb), 1,1,1,3,3-pentafluoropropane ($CF_3CH_2CHF_2$, HFC-245fa), 1,2,2,3-tetrafluoropropane ($CH_2FCF_2CH_2F$, HFC-254ca), 1,1,2,2-tetrafluoropropane ($CHF_2CF_2CH_3$, HFC-254cb), 1,1,2,3-tetrafluoropropane ($CHF_2CHFCH_2F$, HFC-254ea), 1,1,1,2-tetrafluoropropane ($CF_3CHFCH_3$, HFC-254eb), 1,1,3,3-tetrafluoropropane ($CHF_2CH_2CHF_2$, HFC-254fa), 1,1,1,3-tetrafluoropropane ($CF_3CH_2CH_2F$, HFC-254fb), 1,1,1-trifluoropropane ($CF_3CH_2CH_3$, HFC-263fb), 2,2-difluoropropane ($CH_3CF_2CH_3$, HFC-272ca), 1,2-difluoropropane ($CH_2FCHFCH_3$, HFC-272ea), 1,3-difluoropropane ($CH_2FCH_2CH_2F$, HFC-272fa), 1,1-difluoropropane ($CHF_2CH_2CH_3$, HFC-272fb), 2-fluoropropane ($CH_3CHFCH_3$, HFC-281ea), 1-fluoropropane ($CH_2FCH_2CH_3$, HFC-281fa), 1,1,2,2,3,3,4,4-octafluorobutane ($CHF_2CF_2CF_2CHF_2$, HFC-338 pcc), 1,1,1,2,2,4,4,4-octafluorobutane ($CF_3CH_2CF_2CF_3$, HFC-338mf), 1,1,1,3,3-pentafluorobutane ($CF_3CH_2CHF_2$, HFC-365mfc), 1,1,1,2,3,4,4,5,5,5-decafluoropentane ($CF_3CHFCHFCF_2CF_3$, HFC-43-10mee), and 1,1,1,2,2,3,4,5,5,6,6,7,7,7-tetradecafluoroheptane ($CF_3CF_2CHFCHFCF_2CF_2CF_3$, HFC-63-14mee).

In some embodiments, heat transfer compositions may comprise fluoroethers. Fluoroethers comprise at least one compound having carbon, fluorine, oxygen and optionally hydrogen, chlorine, bromine or iodine. Fluoroethers are commercially available or may be produced by methods known in the art. Representative fluoroethers include but are not limited to nonafluoromethoxybutane ($C_4F_9OCH_3$, any or all possible isomers or mixtures thereof); nonafluoroethoxybutane ($C_4F_9OC_2H_5$, any or all possible isomers or mixtures thereof); 2-difluoromethoxy-1,1,1,2-tetrafluoroethane (HFOC-236eaEβγ, or $CHF_2OCHFCF_3$); 1,1-difluoro-2-methoxyethane (HFOC-272fbEβγ, $CH_3OCH_2CHF_2$); 1,1,1,3,3,3-hexafluoro-2-(fluoromethoxy)propane (HFOC-347 mmzEβγ, or $CH_2FOCH(CF_3)_2$); 1,1,1,3,3,3-hexafluoro-2-methoxypropane (HFOC-356 mmzEβγ, or $CH_3OCH(CH_3)_2$); 1,1,1,2,2-pentafluoro-3-methoxypropane (HFOC-365mcEγδ, or $CF_3CF_2CH_2OCH_3$); 2-ethoxy-1,1,1,2,3,3,3-heptafluoropropane (HFOC-467 mmyEβγ, or $CH_3CH_2OCF(CF_3)_2$; and mixtures thereof.

In some embodiments, heat transfer compositions may comprise fluoroolefins. Fluoroolefins comprise at least one compound with 2 to 12 carbon atoms, in another embodiment the fluoroolefins comprise compounds with 3 to 10 carbon atoms, and in yet another embodiment the fluoroolefins comprise compounds with 3 to 7 carbon atoms. Representative fluoroolefins include but are not limited to all compounds as listed in Table 1, Table 2, and Table 3.

In one embodiment, fluoroolefins have the formula E- or Z—$R^1CH=CHR^2$ (Formula 1), wherein $R^1$ and $R^2$ are, independently, $C_1$ to $C_6$ perfluoroalkyl groups. Examples of $R^1$ and $R^2$ groups include, but are not limited to, $CF_3$, $C_2F_5$, $CF_2CF_2CF_3$, $CF(CF_3)_2$, $CF_2CF_2CF_2CF_3$, $CF(CF_3)CF_2CF_3$, $CF_2CF(CF_3)_2$, $C(CF_3)_3$, $CF_2CF_2CF_2CF_2CF_3$, $CF_2CF_2CF(CF_3)_2$, $C(CF_3)_2C_2F_5$, $CF_2CF_2CF_2CF_2CF_2CF_3$, $CF(CF_3)$ $CF_2CF_2C_2F_5$, and $C(CF_3)_2CF_2C_2F_5$. In one embodiment the fluoroolefins of Formula 1 have at least about 4 carbon atoms in the molecule. In another embodiment, the fluoroolefins of Formula 1 have at least about 5 carbon atoms in the molecule. Exemplary, non-limiting Formula 1 compounds are presented in Table 1.

TABLE 1

| Code | Structure | Chemical Name |
|---|---|---|
| F11E | $CF_3CH=CHCF_3$ | 1,1,1,4,4,4-hexafluorobut-2-ene |
| F12E | $CF_3CH=CHC_2F_5$ | 1,1,1,4,4,5,5,5-octafluoropent-2-ene |
| F13E | $CF_3CH=CHCF_2C_2F_5$ | 1,1,1,4,4,5,5,6,6,6-decafluorohex-2-ene |
| F13iE | $CF_3CH=CHCF(CF_3)_2$ | 1,1,1,4,5,5,5-heptafluoro-4-(trifluoromethyl)pent-2-ene |
| F22E | $C_2F_5CH=CHC_2F_5$ | 1,1,1,2,2,5,5,6,6,6-decafluorohex-3-ene |
| F14E | $CF_3CH=CH(CF_2)_3CF_3$ | 1,1,1,4,4,5,5,6,6,7,7,7-dodecafluorohept-2-ene |
| F14iE | $CF_3CH=CHCF_2CF-(CF_3)_2$ | 1,1,1,4,4,5,6,6,6-nonafluoro-5-(trifluoromethyl)hex-2-ene |
| F14sE | $CF_3CH=CHCF(CF_3)-C_2F_5$ | 1,1,1,4,5,5,6,6,6-nonfluoro-4-(trifluoromethyl)hex-2-ene |
| F14tE | $CF_3CH=CHC(CF_3)_3$ | 1,1,1,5,5,5-hexafluoro-4,4-bis(trifluoromethyl)pent-2-ene |
| F23E | $C_2F_5CH=CHCF_2C_2F_5$ | 1,1,1,2,2,5,5,6,6,7,7,7-dodecafluorohept-3-ene |
| F23iE | $C_2F_5CH=CHCF(CF_3)_2$ | 1,1,1,2,2,5,6,6,6-nonafluoro-5-(trifluoromethyl)hex-3-ene |
| F15E | $CF_3CH=CH(CF_2)_4CF_3$ | 1,1,1,4,4,5,5,6,6,7,7,8,8,8-tetradecafluorooct-2-ene |
| F15iE | $CF_3CH=CH-CF_2CF_2CF(CF_3)_2$ | 1,1,1,4,4,5,5,6,6,7,7-undecafluoro-6-(trifluoromethyl)hept-2-ene |
| F15tE | $CF_3CH=CH-C(CF_3)_2C_2F_5$ | 1,1,1,5,5,6,6,6-octafluoro-4,4-bis(trifluoromethyl)hex-2-ene |
| F24E | $C_2F_5CH=CH(CF_2)_3CF_3$ | 1,1,1,2,2,5,5,6,6,7,7,8,8,8-tetradecafluorooct-3-ene |
| F24iE | $C_2F_5CH=CHCF_2CF-(CF_3)_2$ | 1,1,1,2,2,5,5,6,7,7,7-undecafluoro-6-(trifluoromethyl)hept-3-ene |
| F24sE | $C_2F_5CH=CHCF(CF_3)-C_2F_5$ | 1,1,1,2,2,5,6,6,7,7,7-undecafluoro-5-(trifluoromethyl)hept-3-ene |
| F24tE | $C_2F_5CH=CHC(CF_3)_3$ | 1,1,1,2,2,6,6,6-octafluoro-5,5-bis(trifluoromethyl)hex-3-ene |
| F33E | $C_2F_5CF_2CH=CH-CF_2C_2F_5$ | 1,1,1,2,2,3,3,6,6,7,7,8,8,8-tetradecafluorooct-4-ene |
| F3i3iE | $(CF_3)_2CFCH=CH-CF(CF_3)_2$ | 1,1,1,2,5,6,6,6-octafluoro-2,5-bis(trifluoromethyl)hex-3-ene |
| F33iE | $C_2F_5CF_2CH=CH-CF(CF_3)_2$ | 1,1,1,2,2,5,5,6,6,7,7,7-undecafluoro-2-(trifluoromethyl)hept-3-ene |
| F16E | $CF_3CH=CH(CF_2)_5CF_3$ | 1,1,1,4,4,5,5,6,6,7,7,8,8,,9,9,9-hexadecafluoronon-2-ene |
| F16sE | $CF_3CH=CHCF(CF_3)(CF_2)_2C_2F_5$ | 1,1,1,4,5,5,6,6,7,7,8,8,8-tridecafluoro-4-(trifluoromethyl)hept-2-ene |
| F16tE | $CF_3CH=CHC(CF_3)_2CF_2C_2F_5$ | 1,1,1,6,6,6-octafluoro-4,4-bis(trifluoromethyl)hept-2-ene |
| F25E | $C_2F_5CH=CH(CF_2)_4CF_3$ | 1,1,1,2,2,5,5,6,6,7,7,8,8,9,9,9-hexadecafluoronon-3-ene |
| F25iE | $C_2F_5CH=CH-CF_2CF_2CF(CF_3)_2$ | 1,1,1,2,2,5,5,6,6,7,8,8,8-tridecafluoro-7-(trifluoromethyl)oct-3-ene |
| F25tE | $C_2F_5CH=CH-C(CF_3)_2C_2F_5$ | 1,1,1,2,2,6,6,7,7,7-decafluoro-5,5-bis(trifluoromethyl)hept-3-ene |
| F34E | $C_2F_5CF_2CH=CH-(CF_2)_3CF_3$ | 1,1,1,2,2,3,3,6,6,7,7,8,8,9,9,9-hexadecafluoronon-4-ene |
| F34iE | $C_2F_5CF_2CH=CH-CF_2CF(CF_3)_2$ | 1,1,1,2,2,3,3,6,6,7,8,8,8-tridecafluoro-7-(trifluoromethyl)oct-4-ene |
| F34sE | $C_2F_5CF_2CH=CH-CF(CF_3)C_2F_5$ | 1,1,1,2,2,3,3,6,7,7,8,8,8-tridecafluoro-6-(trifluoromethyl)oct-4-ene |
| F34tE | $C_2F_5CF_2CH=CH-C(CF_3)_3$ | 1,1,1,5,5,6,6,7,7,7-decafluoro-2,2-bis(trifluoromethyl)hept-3-ene |
| F3i4E | $(CF_3)_2CFCH=CH-(CF_2)_3CF_3$ | 1,1,1,2,5,5,6,6,7,7,8,8,8-tridecafluoro-2-(trifluoromethyl)oct-3-ene |
| F3i4iE | $(CF_3)_2CFCH=CH-CF_2CF(CF_3)_2$ | 1,1,1,2,5,5,6,6,7,7,7-decafluoro-2,6-bis(trifluoromethyl)hept-3-ene |
| F3i4sE | $(CF_3)_2CFCH=CH-CF(CF_3)C_2F_5$ | 1,1,1,2,5,6,6,7,7,7-decafluoro-2,5-bis(trifluoromethyl)hept-3-ene |
| F3i4tE | $(CF_3)_2CFCH=CH-C(CF_3)_3$ | 1,1,1,2,6,6,6-heptafluoro-2,5,5-tris(trifluoromethyl)hex-3-ene |
| F26E | $C_2F_5CH=CH(CF_2)_5CF_3$ | 1,1,1,2,2,5,5,6,6,7,7,8,8,9,9,10,10,10-octadecafluorodec-3-ene |
| F26sE | $C_2F_5CH=CHCF(CF_3)(CF_2)_2C_2F_5$ | 1,1,1,2,2,5,6,6,7,7,8,8,9,9,9-pentadecafluoro-5-(trifluoromethyl)non-3-ene |
| F26tE | $C_2F_5CH=CHC(CF_3)_2CF_2C_2F_5$ | 1,1,1,2,2,6,6,7,7,8,8,8-dodecafluoro-5,5-bis(trifluoromethyl)oct-3-ene |
| F35E | $C_2F_5CF_2CH=CH-(CF_2)_4CF_3$ | 1,1,1,2,2,3,3,6,6,7,7,8,8,9,9,10,10,10-octadecafluorodec-4-ene |
| F35iE | $C_2F_5CF_2CH=CH-CF_2CF_2CF(CF_3)_2$ | 1,1,1,2,2,3,3,6,6,7,7,8,9,9,9-pentadecafluoro-8-(trifluoromethyl)non-4-ene |
| F35tE | $C_2F_5CF_2CH=CH-C(CF_3)_2C_2F_5$ | 1,1,1,2,2,3,3,7,7,8,8,8-dodecafluoro-6,6-bis(trifluoromethyl)oct-4-ene |
| F3i5E | $(CF_3)_2CFCH=CH-(CF_2)_4CF_3$ | 1,1,1,2,5,5,6,6,7,7,8,8,9,9,9-pentadecafluoro-2-(trifluoromethyl)non-3-ene |
| F3i5iE | $(CF_3)_2CFCH=CH-CF_2CF_2CF(CF_3)_2$ | 1,1,1,2,5,5,6,6,7,8,8,8-dodecafluoro-2,7-bis(trifluoromethyl)oct-3-ene |
| F3i5tE | $(CF_3)_2CFCH=CH-C(CF_3)_2C_2F_5$ | 1,1,1,2,6,6,7,7,7-nonafluoro-2,5,5-tris(trifluoromethyl)hept-3-ene |
| F44E | $CF_3(CF_2)_3CH=CH-(CF_2)_3CF_3$ | 1,1,1,2,2,3,3,4,4,7,7,8,8,9,9,10,10,10-octadecafluorodec-5-ene |

TABLE 1-continued

| Code | Structure | Chemical Name |
|---|---|---|
| F44iE | $CF_3(CF_2)_3CH\!=\!CH\!-\!CF_2CF(CF_3)_2$ | 1,1,1,2,3,3,6,6,7,7,8,8,9,9,9-pentadecafluoro-2-(trifluoromethyl)non-4-ene |
| F44sE | $CF_3(CF_2)_3CH\!=\!CH\!-\!CF(CF_3)C_2F_5$ | 1,1,1,2,2,3,6,6,7,7,8,8,9,9,9-pentadecafluoro-3-(trifluoromethyl)non-4-ene |
| F44tE | $CF_3(CF_2)_3CH\!=\!CH\!-\!C(CF_3)_3$ | 1,1,1,5,5,6,6,7,7,8,8,8-dodecafluoro-2,2,-bis(trifluoromethyl)oct-3-ene |
| F4i4iE | $(CF_3)_2CFCF_2CH\!=\!CH\!-\!CF_2CF(CF_3)_2$ | 1,1,1,2,3,3,6,6,7,8,8,8-dodecafluoro-2,7-bis(trifluoromethyl)oct-4-ene |
| F4i4sE | $(CF_3)_2CFCF_2CH\!=\!CH\!-\!CF(CF_3)C_2F_5$ | 1,1,1,2,3,3,6,7,7,8,8,8-dodecafluoro-2,6-bis(trifluoromethyl)oct-4-ene |
| F4i4tE | $(CF_3)_2CFCF_2CH\!=\!CH\!-\!C(CF_3)_3$ | 1,1,1,5,5,6,7,7,7-nonafluoro-2,2,6-tris(trifluoromethyl)hept-3-ene |
| F4s4sE | $C_2F_5CF(CF_3)CH\!=\!CH\!-\!CF(CF_3)C_2F_5$ | 1,1,1,2,2,3,6,7,7,8,8,8-dodecafluoro-3,6-bis(trifluoromethyl)oct-4-ene |
| F4s4tE | $C_2F_5CF(CF_3)CH\!=\!CH\!-\!C(CF_3)_3$ | 1,1,1,5,6,6,7,7,7-nonafluoro-2,2,5-tris(trifluoromethyl)hept-3-ene |
| F4t4tE | $(CF_3)_3CCH\!=\!CH\!-\!C(CF_3)_3$ | 1,1,1,6,6,6-hexafluoro-2,2,5,5-tetrakis(trifluoromethyl)hex-3-ene |

Compounds of Formula 1 may be prepared by contacting a perfluoroalkyl iodide of the formula $R^1I$ with a perfluoroalkyltrihydroolefin of the formula $R^2CH\!=\!CH_2$ to form a trihydroiodoperfluoroalkane of the formula $R^1CH_2CHIR^2$. This trihydroiodoperfluoroalkane can then be dehydroiodinated to form $R^1CH\!=\!CHR^2$.

Alternatively, the olefin $R^1CH\!=\!CHR^2$ may be prepared by dehydroiodination of a trihydroiodoperfluoroalkane of the formula $R^1CHICH_2R^2$ formed in turn by reacting a perfluoroalkyl iodide of the formula $R^2I$ with a perfluoroalkyltrihydroolefin of the formula $R^1CH\!=\!CH_2$.

Said contacting of a perfluoroalkyl iodide with a perfluoroalkyltrihydroolefin may take place in batch mode by combining the reactants in a suitable reaction vessel capable of operating under the autogenous pressure of the reactants and products at reaction temperature. Suitable reaction vessels include fabricated from stainless steels, in particular of the austenitic type, and the well-known high nickel alloys such as Monel® nickel-copper alloys, sold under the trademark Monel®, nickel based alloys, sold under the trademark Hastelloy® and nickel-chromium alloys, sold under the trademark Inconel®.

Alternatively, the reaction may take be conducted in semi-batch mode in which the perfluoroalkyltrihydroolefin reactant is added to the perfluoroalkyl iodide reactant by means of a suitable addition apparatus such as a pump at the reaction temperature.

The ratio of perfluoroalkyl iodide to perfluoroalkyltrihydroolefin should be between about 1:1 to about 4:1, preferably from about 1.5:1 to 2.5:1. Ratios less than 1.5:1 tend to result in large amounts of the 2:1 adduct as reported by Jeanneaux, et. al. in *Journal of Fluorine Chemistry*, Vol. 4, pages 261-270 (1974).

Preferred temperatures for contacting of said perfluoroalkyl iodide with said perfluoroalkyltrihydroolefin are preferably within the range of about 150° C. to 300° C., preferably from about 170° C. to about 250° C., and most preferably from about 180° C. to about 230° C. Suitable contact times for the reaction of the perfluoroalkyl iodide with the perfluoroalkyltrihydroolefin are from about 0.5 hour to 18 hours, preferably from about 4 to about 12 hours.

The trihydroiodoperfluoroalkane prepared by reaction of the perfluoroalkyl iodide with the perfluoroalkyltrihydroolefin may be used directly in the dehydroiodination step or may preferably be recovered and purified by distillation prior to the dehydroiodination step.

The dehydroiodination step is carried out by contacting the trihydroiodoperfluoroalkane with a basic substance. Suitable basic substances include alkali metal hydroxides (e.g., sodium hydroxide or potassium hydroxide), alkali metal oxide (for example, sodium oxide), alkaline earth metal hydroxides (e.g., calcium hydroxide), alkaline earth metal oxides (e.g., calcium oxide), alkali metal alkoxides (e.g., sodium methoxide or sodium ethoxide), aqueous ammonia, sodium amide, or mixtures of basic substances such as soda lime. Preferred basic substances are sodium hydroxide and potassium hydroxide. Said contacting of the trihydroiodoperfluoroalkane with a basic substance may take place in the liquid phase preferably in the presence of a solvent capable of dissolving at least a portion of both reactants. Solvents suitable for the dehydroiodination step include one or more polar organic solvents such as alcohols (e.g., methanol, ethanol, n-propanol, isopropanol, n-butanol, isobutanol, and tertiary butanol), nitriles (e.g., acetonitrile, propionitrile, butyronitrile, benzonitrile, or adiponitrile), dimethyl sulfoxide, N,N-dimethylformamide, N,N-dimethylacetamide, or sulfolane. The choice of solvent may depend on the boiling point product and the ease of separation of traces of the solvent from the product during purification. Typically, ethanol or isopropanol are good solvents for the reaction.

Typically, the dehydroiodination reaction may be carried out by addition of one of the reactants (either the basic substance or the trihydroiodoperfluoroalkane) to the other reactant in a suitable reaction vessel. Said reaction may be fabricated from glass, ceramic, or metal and is preferably agitated with an impeller or stirring mechanism.

Temperatures suitable for the dehydroiodination reaction are from about 10° C. to about 100° C., preferably from about 20° C. to about 70° C. The dehydroiodination reaction may be carried out at ambient pressure or at reduced or elevated pressure. Of note are dehydroiodination reactions in which the compound of Formula I is distilled out of the reaction vessel as it is formed.

Alternatively, the dehydroiodination reaction may be conducted by contacting an aqueous solution of said basic substance with a solution of the trihydroiodoperfluoroalkane in one or more organic solvents of lower polarity such as an alkane (e.g., hexane, heptane, or octane), aromatic hydrocarbon (e.g., toluene), halogenated hydrocarbon (e.g., methylene chloride, chloroform, carbon tetrachloride, or perchloroethylene), or ether (e.g., diethyl ether, methyl tert-butyl ether, tetrahydrofuran, 2-methyl tetrahydrofuran, dioxane, dimethoxyethane, diglyme, or tetraglyme) in the presence of a phase transfer catalyst. Suitable phase transfer catalysts include quaternary ammonium halides (e.g., tetrabutylammonium bromide, tetrabutylammonium hydrosulfate, triethylbenzylammonium chloride, dodecyltrimethylammonium chloride, and tricaprylylmethylammonium chloride), quaternary phosphonium halides (e.g., triphenylmethylphosphonium bromide and tetraphenylphosphonium chloride), or cyclic polyether compounds known in the art as crown ethers (e.g., 18-crown-6 and 15-crown-5).

Alternatively, the dehydroiodination reaction may be conducted in the absence of solvent by adding the trihydroiodoperfluoroalkane to a solid or liquid basic substance.

Suitable reaction times for the dehydroiodination reactions are from about 15 minutes to about six hours or more depending on the solubility of the reactants. Typically, the dehydroiodination reaction is rapid and requires about 30 minutes to about three hours for completion. The compound of formula 1I may be recovered from the dehydroiodination reaction mixture by phase separation after addition of water, by distillation, or by a combination thereof.

In another embodiment, fluoroolefins comprise cyclic fluoroolefins (cyclo-[CX=CY(CZW)$_n$—] (Formula 2), wherein X, Y, Z, and W are independently selected from H and F, and n is an integer from 2 to 5). In one embodiment the fluoroolefins of Formula 2, have at least about 3 carbon atoms in the molecule. In another embodiment, the fluoroolefins of Formula 2 have at least about 4 carbon atoms in the molecule. In yet another embodiment, the fluoroolefins of Formula 2 have at least about 5 carbon atoms in the molecule. Representative cyclic fluoroolefins of Formula 2 are listed in Table 2.

TABLE 2

| Cyclic fluoroolefins | Structure | Chemical name |
|---|---|---|
| FC-C1316cc | cyclo-CF$_2$CF$_2$CF=CF— | 1,2,3,3,4,4-hexafluorocyclobutene |
| HFC-C1334cc | cyclo-CF$_2$CF$_2$CH=CH— | 3,3,4,4-tetrafluorocyclobutene |
| HFC-C1436 | cyclo-CF$_2$CF$_2$CF$_2$CH=CH— | 3,3,4,4,5,5,-hexafluorocyclopentene |
| FC-C1418y | cyclo-CF$_2$CF=CFCF$_2$CF$_2$— | 1,2,3,3,4,4,5,5-octafluorocyclopentene |
| FC-C151-10y | cyclo-CF$_2$CF=CFCF$_2$CF$_2$CF$_2$— | 1,2,3,3,4,4,5,5,6,6-decafluorocyclohexene |

In another embodiment, fluoroolefins may comprise those compounds listed in Table 3.

TABLE 3

| Name | Structure | Chemical name |
|---|---|---|
| HFC-1225ye | CF$_3$CF=CHF | 1,2,3,3,3-pentafluoro-1-propene |
| HFC-1225zc | CF$_3$CH=CF$_2$ | 1,1,3,3,3-pentafluoro-1-propene |
| HFC-1225yc | CHF$_2$CF=CF$_2$ | 1,1,2,3,3-pentafluoro-1-propene |
| HFC-1234ye | CHF$_2$CF=CHF | 1,2,3,3-tetrafluoro-1-propene |
| HFC-1234yf | CF$_3$CF=CH$_2$ | 2,3,3,3-tetrafluoro-1-propene |
| HFC-1234ze | CF$_3$CH=CHF | 1,3,3,3-tetrafluoro-1-propene |
| HFC-1234yc | CH$_2$FCF=CF$_2$ | 1,1,2,3-tetrafluoro-1-propene |
| HFC-1234zc | CHF$_2$CH=CF$_2$ | 1,1,3,3-tetrafluoro-1-propene |
| HFC-1243yf | CHF$_2$CF=CH$_2$ | 2,3,3-trifluoro-1-propene |
| HFC-1243zf | CF$_3$CH=CH$_2$ | 3,3,3-trifluoro-1-propene |
| HFC-1243yc | CH$_3$CF=CF$_2$ | 1,1,2-trifluoro-1-propene |
| HFC-1243zc | CH$_2$FCH=CF$_2$ | 1,1,3-trifluoro-1-propene |
| HFC-1243ye | CH$_2$FCF=CHF | 1,2,3-trifluoro-1-propene |
| HFC-1243ze | CHF$_2$CH=CHF | 1,3,3-trifluoro-1-propene |
| FC-1318my | CF$_3$CF=CFCF$_3$ | 1,1,1,2,3,4,4,4-octafluoro-2-butene |
| FC-1318cy | CF$_3$CF$_2$CF=CF$_2$ | 1,1,2,3,3,4,4,4-octafluoro-1-butene |
| HFC-1327my | CF$_3$CF=CHCF$_3$ | 1,1,1,2,4,4,4-heptafluoro-2-butene |
| HFC-1327ye | CHF=CFCF$_2$CF$_3$ | 1,2,3,3,4,4,4-heptafluoro-1-butene |
| HFC-1327py | CHF$_2$CF=CFCF$_3$ | 1,1,1,2,3,4,4-heptafluoro-2-butene |
| HFC-1327et | (CF$_3$)$_2$C=CHF | 1,3,3,3-tetrafluoro-2-(trifluoromethyl)-1-propene |
| HFC-1327cz | CF$_2$=CHCF$_2$CF$_3$ | 1,1,3,3,4,4,4-heptafluoro-1-butene |
| HFC-1327cye | CF$_2$=CFCHFCF$_3$ | 1,1,2,3,4,4,4-heptafluoro-1-butene |
| HFC-1327cyc | CF$_2$=CFCF$_2$CHF$_2$ | 1,1,2,3,3,4,4-heptafluoro-1-butene |
| HFC-1336yf | CF$_3$CF$_2$CF=CH$_2$ | 2,3,3,4,4,4-hexafluoro-1-butene |
| HFC-1336ze | CHF=CHCF$_2$CF$_3$ | 1,3,3,4,4,4-hexafluoro-1-butene |
| HFC-1336eye | CHF=CFCHFCF$_3$ | 1,2,3,4,4,4-hexafluoro-1-butene |
| HFC-1336eyc | CHF=CFCF$_2$CHF$_2$ | 1,2,3,3,4,4-hexafluoro-1-butene |
| HFC-1336pyy | CHF$_2$CF=CFCHF$_2$ | 1,1,2,3,4,4-hexafluoro-2-butene |
| HFC-1336qy | CH$_2$FCF=CFCF$_3$ | 1,1,1,2,3,4-hexafluoro-2-butene |
| HFC-1336pz | CHF$_2$CH=CFCF$_3$ | 1,1,1,2,4,4-hexafluoro-2-butene |
| HFC-1336mzy | CF$_3$CH=CFCHF$_2$ | 1,1,1,3,4,4-hexafluoro-2-butene |
| HFC-1336qc | CF$_2$=CFCF$_2$CH$_2$F | 1,1,2,3,3,4-hexafluoro-1-butene |
| HFC-1336pe | CF$_2$=CFCHFCHF$_2$ | 1,1,2,3,4,4-hexafluoro-1-butene |
| HFC-1336ft | CH$_2$=C(CF$_3$)$_2$ | 3,3,3-trifluoro-2-(trifluoromethyl)-1-propene |
| HFC-1345qz | CH$_2$FCH=CFCF$_3$ | 1,1,1,2,4-pentafluoro-2-butene |
| HFC-1345mzy | CF$_3$CH=CFCH$_2$F | 1,1,1,3,4-pentafluoro-2-butene |
| HFC-1345fz | CF$_3$CF$_2$CH=CH$_2$ | 3,3,4,4,4-pentafluoro-1-butene |
| HFC-1345mzz | CHF$_2$CH=CHCF$_3$ | 1,1,1,4,4-pentafluoro-2-butene |

TABLE 3-continued

| Name | Structure | Chemical name |
|---|---|---|
| HFC-1345sy | CH$_3$CF=CFCF$_3$ | 1,1,1,2,3-pentafluoro-2-butene |
| HFC-1345fyc | CH$_2$=CFCF$_2$CH$_2$ | 2,3,3,4,4-pentafluoro-1-butene |
| HFC-1345pyz | CHF$_2$CF=CHCHF$_2$ | 1,1,2,4,4-pentafluoro-2-butene |
| HFC-1345cyc | CH$_3$CF$_2$CF=CF$_2$ | 1,1,2,3,3-pentafluoro-1-butene |
| HFC-1345pyy | CH$_2$FCF=CFCHF$_2$ | 1,1,2,3,4-pentafluoro-2-butene |
| HFC-1345eyc | CH$_2$FCF$_2$CF=CF$_2$ | 1,2,3,3,3-pentafluoro-1-butene |
| HFC-1345ctm | CF$_2$=C(CF$_3$)(CH$_3$) | 1,1,3,3,3-pentafluoro-2-methyl-1-propene |
| HFC-1345ftp | CH$_2$=C(CHF$_2$)(CF$_3$) | 2-(difluoromethyl)-3,3,3-trifluoro-1-propene |
| HFC1345fye | CH$_2$=CFCHFCF$_3$ | 2,3,4,4,4-pentafluoro-1-butene |
| HFC-1345eyf | CHF=CFCH$_2$CF$_3$ | 1,2,4,4,4-pentafluoro-1-butene |
| HFC-1345eze | CHF=CHCHFCF$_3$ | 1,3,4,4,4-pentafluoro-1-butene |
| HFC-1345ezc | CHF=CHCF$_2$CHF$_2$ | 1,3,3,4,4-pentafluoro-1-butene |
| HFC-1345eye | CHF=CFCHFCHF$_2$ | 1,2,3,4,4-pentafluoro-1-butene |
| HFC-1354fzc | CH$_2$=CHCF$_2$CHF$_2$ | 3,3,4,4-tetrafluoro-1-butene |
| HFC-1354ctp | CF$_2$=C(CHF$_2$)(CH$_3$) | 1,1,3,3-tetrafluoro-2-methyl-1-propene |
| HFC-1354etm | CHF=C(CF$_3$)(CH$_3$) | 1,3,3,3-tetrafluoro-2-methyl-1-propene |
| HFC-1354tfp | CH$_2$=C(CHF$_2$)$_2$ | 2-(difluoromethyl)-3,3-difluoro-1-propene |
| HFC-1354my | CF$_3$CF=CHCH$_3$ | 1,1,1,2-tetrafluoro-2-butene |
| HFC-1354mzy | CH$_3$CF=CHCF$_3$ | 1,1,1,3-tetrafluoro-2-butene |
| FC-141-10myy | CF$_3$CF=CFCF$_2$CF$_3$ | 1,1,1,2,3,4,4,5,5,5-decafluoro-2-pentene |
| FC-141-10cy | CF$_2$=CFCF$_2$CF$_2$CF$_3$ | 1,1,2,3,3,4,4,5,5,5-decafluoro-1-pentene |
| HFC-1429mzt | (CF$_3$)$_2$C=CHCF$_3$ | 1,1,1,4,4,4-hexafluoro-2-(trifluoromethyl)-2-butene |
| HFC-1429myz | CF$_3$CF=CHCF$_2$CF$_3$ | 1,1,1,2,4,4,5,5,5-nonafluoro-2-pentene |
| HFC-1429mzy | CF$_3$CH=CFCF$_2$CF$_3$ | 1,1,1,3,4,4,5,5,5-nonafluoro-2-pentene |
| HFC-1429eyc | CHF=CFCF$_2$CF$_2$CF$_3$ | 1,2,3,3,4,4,5,5,5-nonafluoro-1-pentene |
| HFC-1429czc | CF$_2$=CHCF$_2$CF$_2$CF$_3$ | 1,1,3,3,4,4,5,5,5-nonafluoro-1-pentene |
| HFC-1429cycc | CF$_2$=CFCF$_2$CF$_2$CHF$_2$ | 1,1,2,3,3,4,4,5,5-nonafluoro-1-pentene |
| HFC-1429pyy | CHF$_2$CF=CFCF$_2$CF$_3$ | 1,1,2,3,4,4,5,5,5-nonafluoro-2-pentene |
| HFC-1429myyc | CF$_3$CF=CFCF$_2$CHF$_2$ | 1,1,1,2,3,4,4,5,5-nonafluoro-2-pentene |
| HFC-1429myye | CF$_3$CF=CFCHFCF$_3$ | 1,1,1,2,3,4,5,5,5-nonafluoro-2-pentene |
| HFC-1429eyym | CHF=CFCF(CF$_3$)$_2$ | 1,2,3,4,4,4-hexafluoro-3-(trifluoromethyl)-1-butene |
| HFC-1429cyzm | CF$_2$=CFCH(CF$_3$)$_2$ | 1,1,2,4,4,4-hexafluoro-3-(trifluoromethyl)-1-butene |
| HFC-1429mzt | CF$_3$CH=C(CF$_3$)$_2$ | 1,1,1,4,4,4-hexafluoro-2-(trifluoromethyl)-2-butene |
| HFC-1429czym | CF$_2$=CHCF(CF$_3$)$_2$ | 1,1,3,4,4,4-hexafluoro-3-(trifluoromethyl)-1-butene |
| HFC-1438fy | CH$_2$=CFCF$_2$CF$_2$CF$_3$ | 2,3,3,4,4,5,5,5-octafluoro-1-pentene |
| HFC-1438eycc | CHF=CFCF$_2$CF$_2$CHF$_2$ | 1,2,3,3,4,4,5,5-octafluoro-1-pentene |
| HFC-1438ftmc | CH$_2$=C(CF$_3$)CF$_2$CF$_3$ | 3,3,4,4-pentafluoro-2-(trifluoromethyl)-1-butene |
| HFC-1438czzm | CF$_2$=CHCH(CF$_3$)$_2$ | 1,1,4,4,4-pentafluoro-3-(trifluoromethyl)-1-butene |
| HFC-1438ezym | CHF=CHCF(CF$_3$)$_2$ | 1,3,4,4,4-pentafluoro-3-(trifluoromethyl)-1-butene |
| HFC-1438ctmf | CF$_2$=C(CF$_3$)CH$_2$CF$_3$ | 1,1,4,4,4-pentafluoro-2-(trifluoromethyl)-1-butene |
| HFC-1447fzy | (CF$_3$)$_2$CFCH=CH$_2$ | 3,4,4,4-tetrafluoro-3-(trifluoromethyl)-1-butene |
| HFC-1447fz | CF$_3$CF$_2$CF$_2$CH=CH$_2$ | 3,3,4,4,5,5,5-heptafluoro-1-pentene |
| HFC-1447fycc | CH$_2$=CFCF$_2$CF$_2$CHF$_2$ | 2,3,3,4,4,5,5-heptafluoro-1-pentene |
| HFC-1447czcf | CF$_2$=CHCF$_2$CH$_2$CF$_3$ | 1,1,3,3,5,5,5-heptafluoro-1-pentene |
| HFC-1447mytm | CF$_3$CF=C(CF$_3$)(CH$_3$) | 1,1,1,2,4,4,4-heptafluoro-3-methyl-2-butene |
| HFC-1447fyz | CH$_2$=CFCH(CF$_3$)$_2$ | 2,4,4,4-tetrafluoro-3-(trifluoromethyl)-1-butene |
| HFC-1447ezz | CHF=CHCH(CF$_3$)$_2$ | 1,4,4,4-tetrafluoro-3-(trifluoromethyl)-1-butene |

TABLE 3-continued

| Name | Structure | Chemical name |
|---|---|---|
| HFC-1447qzt | $CH_2FCH{=}C(CF_3)_2$ | 1,4,4,4-tetrafluoro-2-(trifluoromethyl)-2-butene |
| HFC-1447syt | $CH_3CF{=}C(CF_3)_2$ | 2,4,4,4-tetrafluoro-2-(trifluoromethyl)-2-butene |
| HFC-1456szt | $(CF_3)_2C{=}CHCH_3$ | 3-(trifluoromethyl)-4,4,4-trifluoro-2-butene |
| HFC-1456szy | $CF_3CF_2CF{=}CHCH_3$ | 3,4,4,5,5,5-hexafluoro-2-pentene |
| HFC-1456mstz | $CF_3C(CH_3){=}CHCF_3$ | 1,1,1,4,4,4-hexafluoro-2-methyl-2-butene |
| HFC-1456fzce | $CH_2{=}CHCF_2CHFCF_3$ | 3,3,4,5,5,5-hexafluoro-1-pentene |
| HFC-1456ftmf | $CH_2{=}C(CF_3)CH_2CF_3$ | 4,4,4-trifluoro-2-(trifluoromethyl)-1-butene |
| FC-151-12c | $CF_3(CF_2)_3CF{=}CF_2$ | 1,1,2,3,3,4,4,5,5,6,6,6-dodecafluoro-1-hexene (or perfluoro-1-hexene) |
| FC-151-12mcy | $CF_3CF_2CF{=}CFCF_2CF_3$ | 1,1,1,2,2,3,4,5,5,6,6,6-dodecafluoro-3-hexene (or perfluoro-3-hexene) |
| FC-151-12mmtt | $(CF_3)_2C{=}C(CF_3)_2$ | 1,1,1,4,4,4-hexafluoro-2,3-bis(trifluoromethyl)-2-butene |
| FC-151-12mmzz | $(CF_3)_2CFCF{=}CFCF_3$ | 1,1,1,2,3,4,5,5,5-nonafluoro-4-(trifluoromethyl)-2-pentene |
| HFC-152-11mmtz | $(CF_3)_2C{=}CHC_2F_5$ | 1,1,1,4,4,5,5,5-octafluoro-2-(trifluoromethyl)-2-pentene |
| HFC-152-11mmyyz | $(CF_3)_2CFCF{=}CHCF_3$ | 1,1,1,3,4,5,5,5-octafluoro-4-(trifluoromethyl)-2-pentene |
| PFBE (or HFC-1549fz) | $CF_3CF_2CF_2CF_2CH{=}CH_2$ | 3,3,4,4,5,5,6,6,6-nonafluoro-1-hexene (or perfluorobutylethylene) |
| HFC-1549fztmm | $CH_2{=}CHC(CF_3)_3$ | 4,4,4-trifluoro-3,3-bis(trifluoromethyl)-1-butene |
| HFC-1549mmtts | $(CF_3)_2C{=}C(CH_3)(CF_3)$ | 1,1,1,4,4,4-hexafluoro-3-methyl-2-(trifluoromethyl)-2-butene |
| HFC-1549fycz | $CH_2{=}CFCF_2CH(CF_3)_2$ | 2,3,3,5,5,5-hexafluoro-4-(trifluoromethyl)-1-pentene |
| HFC-1549myts | $CF_3CF{=}C(CH_3)CF_2CF_3$ | 1,1,1,2,4,4,5,5,5-nonafluoro-3-methyl-2-pentene |
| HFC-1549mzzz | $CF_3CH{=}CHCH(CF_3)_2$ | 1,1,1,5,5,5-hexafluoro-4-(trifluoromethyl)-2-pentene |
| HFC-1558szy | $CF_3CF_2CF_2CF{=}CHCH_3$ | 3,4,4,5,5,6,6,6-octafluoro-2-hexene |
| HFC-1558fzccc | $CH_2{=}CHCF_2CF_2CF_2CHF_2$ | 3,3,4,4,5,5,6,6-octafluoro-2-hexene |
| HFC-1558mmtzc | $(CF_3)_2C{=}CHCF_2CH_3$ | 1,1,1,4,4-pentafluoro-2-(trifluoromethyl)-2-pentene |
| HFC-1558ftmf | $CH_2{=}C(CF_3)CH_2C_2F_5$ | 4,4,5,5,5-pentafluoro-2-(trifluoromethyl)-1-pentene |
| HFC-1567fts | $CF_3CF_2CF_2C(CH_3){=}CH_2$ | 3,3,4,4,5,5,5-heptafluoro-2-methyl-1-pentene |
| HFC-1567szz | $CF_3CF_2CF_2CH{=}CHCH_3$ | 4,4,5,5,6,6,6-heptafluoro-2-hexene |
| HFC-1567fzfc | $CH_2{=}CHCH_2CF_2C_2F_5$ | 4,4,5,5,6,6,6-heptafluoro-1-hexene |
| HFC-1567sfyy | $CF_3CF_2CF{=}CFC_2H_5$ | 1,1,1,2,2,3,4-heptafluoro-3-hexene |
| HFC-1567fzfy | $CH_2{=}CHCH_2CF(CF_3)_2$ | 4,5,5,5-tetrafluoro-4-(trifluoromethyl)-1-pentene |
| HFC-1567myzzm | $CF_3CF{=}CHCH(CF_3)(CH_3)$ | 1,1,1,2,5,5,5-heptafluoro-4-methyl-2-pentene |
| HFC-1567mmtyf | $(CF_3)_2C{=}CFC_2H_5$ | 1,1,1,3-tetrafluoro-2-(trifluoromethyl)-2-pentene |
| FC-161-14myy | $CF_3CF{=}CFCF_2CF_2C_2F_5$ | 1,1,1,2,3,4,4,5,5,6,6,7,7,7-tetradecafluoro-2-heptene |
| FC-161-14mcyy | $CF_3CF_2CF{=}CFCF_2C_2F_5$ | 1,1,1,2,2,3,4,5,5,6,6,7,7,7-tetradecafluoro-2-heptene |
| HFC-162-13mzy | $CF_3CH{=}CFCF_2CF_2C_2F_5$ | 1,1,1,3,4,4,5,5,6,6,7,7,7-tridecafluoro-2-heptene |
| HFC162-13myz | $CF_3CF{=}CHCF_2CF_2C_2F_5$ | 1,1,1,2,4,4,5,5,6,6,7,7,7-tridecafluoro-2-heptene |
| HFC-162-13mczy | $CF_3CF_2CH{=}CFCF_2C_2F_5$ | 1,1,1,2,2,4,5,5,6,6,7,7,7-tridecafluoro-3-heptene |
| HFC-162-13mcyz | $CF_3CF_2CF{=}CHCF_2C_2F_5$ | 1,1,1,2,2,3,5,5,6,6,7,7,7-tridecafluoro-3-heptene |
| PEVE | $CF_2{=}CFOCF_2CF_3$ | pentafluoroethyl trifluorovinyl ether |
| PMVE | $CF_2{=}CFOCF_3$ | trifluoromethyl trifluorovinyl ether |

The compounds listed in Table 2 and Table 3 are available commercially or may be prepared by processes known in the art or as described herein.

1,1,1,4,4-pentafluoro-2-butene may be prepared from 1,1,1,2,4,4-hexafluorobutane ($CHF_2CH_2CHFCF_3$) by dehydrofluorination over solid KOH in the vapor phase at room temperature. The synthesis of 1,1,1,2,4,4-hexafluorobutane is described in U.S. Pat. No. 6,066,768, incorporated herein by reference.

1,1,1,4,4,4-hexafluoro-2-butene may be prepared from 1,1,1,4,4,4-hexafluoro-2-iodobutane ($CF_3CHICH_2CF_3$) by reaction with KOH using a phase transfer catalyst at about 60°

C. The synthesis of 1,1,1,4,4,4-hexafluoro-2-iodobutane may be carried out by reaction of perfluoromethyl iodide ($CF_3I$) and 3,3,3-trifluoropropene ($CF_3CH=CH_2$) at about 200° C. under autogenous pressure for about 8 hours.

3,4,4,5,5,5-hexafluoro-2-pentene may be prepared by dehydrofluorination of 1,1,1,2,2,3,3-heptafluoropentane ($CF_3CF_2CF_2CH_2CH_3$) using solid KOH or over a carbon catalyst at 200-300° C. 1,1,1,2,2,3,3-heptafluoropentane may be prepared by hydrogenation of 3,3,4,4,5,5,5-heptafluoro-1-pentene ($CF_3CF_2CF_2CH=CH_2$).

1,1,1,2,3,4-hexafluoro-2-butene may be prepared by dehydrofluorination of 1,1,1,2,3,3,4-heptafluorobutane ($CH_2FCF_2CHFCF_3$) using solid KOH.

1,1,1,2,4,4-hexafluoro-2-butene may be prepared by dehydrofluorination of 1,1,1,2,2,4,4-heptafluorobutane ($CHF_2CH_2CF_2CF_3$) using solid KOH.

1,1,1,3,4,4-hexafluoro2-butene may be prepared by dehydrofluorination of 1,1,1,3,3,4,4-heptafluorobutane ($CF_3CH_2CF_2CHF_2$) using solid KOH.

1,1,1,2,4-pentafluoro-2-butene may be prepared by dehydrofluorination of 1,1,1,2,2,3-hexafluorobutane ($CH_2FCH_2CF_2CF_3$) using solid KOH.

1,1,1,3,4-pentafluoro-2-butene may be prepared by dehydrofluorination of 1,1,1,3,3,4-hexafluorobutane ($CF_3CH_2CF_2CH_2F$) using solid KOH.

1,1,1,3-tetrafluoro-2-butene may be prepared by reacting 1,1,1,3,3-pentafluorobutane ($CF_3CH_2CF_2CH_3$) with aqueous KOH at 120° c.

1,1,1,4,4,5,5,5-octafluoro-2-pentene may be prepared from ($CF_3CHICH_2CF_2CF_3$) by reaction with KOH using a phase transfer catalyst at about 60° C. The synthesis of 4-iodo-1,1,1,2,2,5,5,5-octafluoropentane may be carried out by reaction of perfluoroethyliodide ($CF_3CF_2I$) and 3,3,3-trifluoropropene at about 200° C. under autogenous pressure for about 8 hours.

1,1,1,2,2,5,5,6,6,6-decafluoro-3-hexene may be prepared from 1,1,1,2,2,5,5,6,6,6-decafluoro-3-iodohexane ($CF_3CF_2CHICH_2CF_2CF_3$) by reaction with KOH using a phase transfer catalyst at about 60° C. The synthesis of 1,1,1,2,2,5,5,6,6,6-decafluoro-3-iodohexane may be carried out by reaction of perfluoroethyliodide ($CF_3CF_2I$) and 3,3,4,4,4-pentafluoro-1-butene ($CF_3CF_2CH=CH_2$) at about 200° C. under autogenous pressure for about 8 hours.

1,1,1,4,5,5,5-heptafluoro-4-(trifluoromethyl)-2-pentene may be prepared by the dehydrofluorination of 1,1,1,2,5,5,5-heptafluoro-4-iodo-2-(trifluoromethyl)-pentane ($CF_3CHICH_2CF(CF_3)_2$) with KOH in isopropanol. $CF_3CHICH_2CF(CF_3)_2$ is made from reaction of $(CF_3)_2CFI$ with $CF_3CH=CH_2$ at high temperature, such as about 200° C.

1,1,1,4,4,5,5,6,6,6-decafluoro-2-hexene may be prepared by the reaction of 1,1,1,4,4,4-hexafluoro-2-butene ($CF_3CH=CHCF_3$) with tetrafluoroethylene ($CF_2=CF_2$) and antimony pentafluoride ($SbF_5$).

2,3,3,4,4-pentafluoro-1-butene may be prepared by dehydrofluorination of 1,1,2,2,3,3-hexafluorobutane over fluorided alumina at elevated temperature.

2,3,3,4,4,5,5,5-ocatafluoro-1-pentene may be prepared by dehydrofluorination of 2,2,3,3,4,4,5,5,5-nonafluoropentane over solid KOH.

1,2,3,3,4,4,5,5-octafluoro-1-pentene may be prepared by dehydrofluorination of 2,2,3,3,4,4,5,5,5-nonafluoropentane over fluorided alumina at elevated temperature.

In some embodiments, the heat transfer compositions may comprise a single compound of Formula 1, Formula 2, or from Tables 1, 2 or 3, or alternatively may comprise a combination of compounds of Formula 1, a combination of compounds of Formula 2, or a combination of compounds from Tables 1, 2 or 3. Also, in an additional embodiment, the heat transfer compositions may comprise a combination of compounds of Formula 1, Formula 2, or from Tables 1, 2 or 3 with any other class of compounds as defined herein (i.e., compounds of Formula 1, Formula 2 or Tables 1, 2 or 3), either alone or in combination, as possibly being a component of the present heat transfer compositions.

Many of the compounds of Formula 1, Formula 2, Table 1, Table 2, and Table 3 exist as different configurational isomers or stereoisomers. When the specific isomer is not designated, the present invention is intended to include all single configurational isomers, single stereoisomers, or any combination thereof. For instance, F11E is meant to represent the E-isomer, Z-isomer, or any combination or mixture of both isomers in any ratio. As another example, HFC-1225ye is meant to represent the E-isomer, Z-isomer, or any combination or mixture of both isomers in any ratio. In one embodiment, HFC-1225ye may comprise predominantly Z-HFC-1225ye, in which embodiment increased refrigeration capacity may be achieved.

The heat transfer composition may comprise at least one hydrocarbon. Hydrocarbons are compounds having only carbon and hydrogen. Of particular utility are compounds having 3-7 carbon atoms. Hydrocarbons are commercially available through numerous chemical suppliers. Representative hydrocarbons include but are not limited to propane, n-butane, isobutane, cyclobutane, n-pentane, 2-methylbutane, 2,2-dimethylpropane, cyclopentane, n-hexane, 2-methylpentane, 2,2-dimethylbutane, 2,3-dimethylbutane, 3-methylpentane, cyclohexane, n-heptane, cycloheptane, and mixtures thereof. In some embodiments, heat transfer compositions may comprise hydrocarbons containing heteroatoms, such as dimethylether (DME, $CH_3OCH_3$), and may be included as refrigerants of the present invention. DME is commercially available.

In some embodiments, heat transfer compositions may comprise carbon dioxide ($CO_2$), which is commercially available from various sources or may be prepared by methods known in the art.

In some embodiments, heat transfer compositions may comprise ammonia ($NH_3$), which is commercially available from various sources or may be prepared by methods known in the art.

In some embodiments, heat transfer compositions may comprise iodotrifluoromethane ($CF_3I$), which is commercially available from various sources or may be prepared by methods known in the art.

In another embodiment, heat transfer compositions may comprise at least one compound selected from the group consisting of HFC-32, HFC-125, HFC-134a, HFC-152a, HFC-161, and mixtures thereof., meaning mixtures of any of the compounds listed in this paragraph.

In another embodiment, heat transfer compositions may comprise at least one compound from the group consisting of HFC-1225ye, HFC-1234yf, HFC-1234ze, HFC-1243zf, and mixtures thereof.

In another embodiment, heat transfer compositions may comprise HFC-32, HFC-125, and HFC-134a (ASHRAE designated as R407A, R407B, or R407C depending upon the concentration of each component); or HFC-32 and HFC-1225ye; or HFC-1234yf and $CF_3I$; or HFC-32, HFC-134a, and HFC-1225ye; or HFC-32, HFC-1225ye, and HFC-1234yf; or HFC-125, HFC-1225ye, and HFC-1234yf; or HFC-32, HFC-1225ye, HFC-1234yf, and $CF_3I$; HFC-134a, HFC-1225ye, and HFC-1234yf; HFC-134a and HFC-1234yf; or HFC-125 and HFC-1234yf.

In another embodiment, heat transfer compositions may comprise a mixture selected from the group consisting of: HFC-125, HFC-134a, and n-butane (ASHRAE designated as R417A); HFC-125, HFC-134a, and dimethyl ether (ASHRAE designated as R419A); HFC-125, HFC-134a, and isobutane (ASHRAE designated as R422A, R422B, R422c or R422D depending upon the concentration of each component); HFC-134a and HFC-227ea (ASHRAE designated as R423A); HFC-125, HFC-134a, n-butane, isobutane and isopentane (ASHRAE designated as R424A); HFC-134a, HFC-32, and HFC-227ea (ASHRAE designated as R425A); HFC-125, HFC-134a, n-butane, and isopentane (ASHRAE designated as R426A); HFC-32, HFC-125, HFC-143a, and HFC-134a (ASHRAE designated as R427A); HFC-125, HFC-143a, propane, and isobutane (ASHRAE designated as R428A); and HFC-125, HFC-134a, n-butane, and n-pentane (ASHRAE designated as R437A).

In another embodiment, heat transfer compositions may comprise a mixture selected from the group consisting of:
HFC-32, HFC-125, and HFC-1225ye;
HFC-32 and HFC-1234yf;
HFC-32, HFC-125, and HFC-1234yf;
HFC-32, HFC-134a, and HFC-1234yf;
HFC-32, HFC-125, HFC-134a, and HFC-1234yf;
dimethylether and HFC-1234yf;
HFC-152a and HFC-1234yf;
HFC-152a, HFC-134a, and HFC-1234yf;
HFC-152a, n-butane, and HFC-1234yf;
HFC-134a, propane, and HFC-1234yf;
HFC-125, HFC-152a, and HFC-1234yf;
HFC-125, HFC-134a, and HFC-1234yf;
HFC-32, HFC-1234ze, and HFC-1234yf;
HFC-125, HFC-1234ze, and HFC-1234yf;
HFC-32, HFC-1234ze, HFC-1234yf, and $CF_3I$;
HFC-134a, HFC-1234ze, and HFC-1234yf;
HFC-134a and HFC-1234ze;
HFC-32 and HFC-1234ze;
HFC-125 and HFC-1234ze;
HFC-32, HFC-125, and HFC-1234ze;
HFC-32, HFC-134a, and HFC-1234ze;
dimethylether and HFC-1234ze;
HFC-152a and HFC-1234ze;
HFC-152a, HFC-134a, and HFC-1234ze;
HFC-152a, n-butane, and HFC-1234ze;
HFC-134a, propane, and HFC-1234ze;
HFC-125, HFC-152a, and HFC-1234ze; and
HFC-125, HFC-134a, and HFC-1234ze.

In one embodiment, the heat transfer composition may be a non-azeotropic composition. The present invention is particularly useful with such compositions, since a leak in a system using such compositions will produce a significant pressure change, as explained above.

In certain embodiments, additional components may be included in the heat transfer compositions. These additional components may comprise lubricants, compatibilizers, solubilizing agents, stabilizers, UV dyes, tracers, perfluoropolyethers (PFPEs), and functionalized perfluoropolyethers.

The heat transfer compositions as disclosed herein may further comprise at least one lubricant selected from the group consisting of polyalkylene glycols, polyol esters, polyvinylethers, polycarbonates, mineral oils, alkylbenzenes, synthetic paraffins, synthetic naphthenes, and poly(alpha) olefins.

Lubricants of the present invention comprise those suitable for use with refrigeration or air-conditioning apparatus. Among these lubricants are those conventionally used in vapor compression refrigeration apparatus utilizing chlorofluorocarbon refrigerants. Lubricants of the present invention may comprise those commonly known as "mineral oils" in the field of compression refrigeration lubrication. Mineral oils comprise paraffins (i.e. straight-chain and branched-carbon-chain, saturated hydrocarbons), naphthenes (i.e. cyclic paraffins) and aromatics (i.e. unsaturated, cyclic hydrocarbons containing one or more rings characterized by alternating double bonds). Lubricants of the present invention further comprise those commonly known as "synthetic oils" in the field of compression refrigeration lubrication. Synthetic oils comprise alkylaryls (i.e. linear and branched alkyl alkylbenzenes), synthetic paraffins and naphthenes, and poly(alphaolefins). Representative conventional lubricants of the present invention are the commercially available BVM 100 N (paraffinic mineral oil sold by BVA Oils), Suniso® 3GS and Suniso® 5GS (naphthenic mineral oil sold by Crompton Co.), Sontex® 372LT (naphthenic mineral oil sold by Pennzoil), Calumet® RO-30 (naphthenic mineral oil sold by Calumet Lubricants), Zerol® 75, Zerol® 150 and Zerol® 500 (linear alkylbenzenes sold by Shrieve Chemicals) and HAB 22 (branched alkylbenzene sold by Nippon Oil).

Lubricants of the present invention further comprise those which have been designed for use with hydrofluorocarbon refrigerants and are miscible with refrigerants of the present invention under compression refrigeration and air-conditioning apparatus' operating conditions. Such lubricants include, but are not limited to, polyol esters (POEs) such as Castrol® 100 (Castrol, United Kingdom), polyalkylene glycols (PAGs) such as RL-488A from Dow (Dow Chemical, Midland, Mich.), polyvinyl ethers (PVEs), and polycarbonates (PCs).

Lubricants of the present invention may be selected by considering a given compressor's requirements and the environment to which the lubricant will be exposed.

The compositions of the present invention may further comprise about 0.01 weight percent to about 5 weight percent of a stabilizer, free radical scavenger or antioxidant. Such other additives include but are not limited to, nitromethane, hindered phenols, hydroxylamines, thiols, phosphites, or lactones. Single additives or combinations may be used.

Optionally, certain refrigeration or air-conditioning system additives may be added, as desired, to compositions of the present invention in order to enhance performance and system stability. These additives are known in the field of refrigeration and air-conditioning, and include, but are not limited to, anti wear agents, extreme pressure lubricants, corrosion and oxidation inhibitors, metal surface deactivators, free radical scavengers, and foam control agents. In general, these additives may be present in the inventive compositions in small amounts relative to the overall composition. Typically concentrations of from less than about 0.1 weight percent to as much as about 3 weight percent of each additive are used. These additives are selected on the basis of the individual system requirements. These additives include members of the triaryl phosphate family of EP (extreme pressure) lubricity additives, such as butylated triphenyl phosphates (BTPP), or other alkylated triaryl phosphate esters, e.g. Syn-O-Ad 8478 from Akzo Chemicals, tricresyl phosphates and related compounds. Additionally, the metal dialkyl dithiophosphates (e.g. zinc dialkyl dithiophosphate (or ZDDP), Lubrizol 1375 and other members of this family of chemicals may be used in compositions of the present invention. Other antiwear additives include natural product oils and asymmetrical polyhydroxyl lubrication additives, such as Synergol TMS (International Lubricants). Similarly, stabilizers such as antioxidants, free radical scavengers, and water scavengers may be employed. Compounds in this category can include, but are not limited to, butylated hydroxy toluene (BHT), epoxides, and mixtures thereof. Corrosion inhibitors include dodecyl succinic acid (DDSA), amine phosphate (AP), oleoyl sarcosine, imidazone derivatives and substituted sulphonates. Metal surface deactivators include areoxalyl bis (benzylidene) hydrazide (CAS reg no. 6629-10-3), N,N'-bis(3,5-di-tert-butyl-4-hydroxyhydrocinnamoylhydrazine (CAS reg no. 32687-78-8), 2,2,'-oxamidobis-ethyl-(3,5-di-tert-butyl-4-hydroxyhydrocinnamate (CAS reg no. 70331-94-1), N,N'-(disalicyclidene)-1,2-diaminopropane (CAS reg no. 94-91-7) and ethylenediaminetetra-acetic acid (CAS reg no. 60-00-4) and its salts, and mixtures thereof.

Additional additives include stabilizers comprising at least one compound selected from the group consisting of hindered phenols, thiophosphates, butylated triphenylphosphorothionates, organo phosphates, or phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephthalic acid, diphenyl terephthalic acid, ionic liquids, and mixtures thereof. Representative stabilizer compounds include but are not limited to tocopherol; hydroquinone; t-butyl hydroquinone; monothiophosphates; dithiophosphates, such as the dithiophosphate commercially available from Ciba Specialty Chemicals, Basel, Switzerland (hereinafter "Ciba") under the trademark Irgalube® 63; dialkylthiophosphate esters, commercially available from Ciba under the trademarks Irgalube® 353 and Irgalube® 350 (Ciba); butylated triphenylphosphorothionates, commercially available from Ciba under the trademark Irgalube® 232; amine phosphates, commercially available from Ciba under the trademark Irgalube® 349; hindered phosphites, commercially available from Ciba under the trademark Irgafos® 168; (Tris-(di-tert-butylphenyl) phosphite), commercially available from Ciba under the trademark Irgafos® OPH; (Di-n-octyl phosphite, commercially available from Ciba under the trademark Irgafos® DDPP; (Iso-decyl diphenyl phosphate, commercially available from Ciba; anisole; 1,4-dimethoxybenzene; 1,4-diethoxybenzene; 1,3,5-trimethoxybenzene; d-limonene; retinal; pinene; menthol; Vitamin A; terpinene; dipentene; lycopene; beta carotene; bornane; 1,2-propylene oxide; 1,2-butylene oxide; n-butyl glycidyl ether; trifluoromethyloxirane; 1,1-bis(trifluoromethyl)oxirane; 3-ethyl-3-hydroxymethyl-oxetane, such as OXT-101 (Toagosei Co., Ltd); 3-ethyl-3-((phenoxy)methyl)-oxetane, such as OXT-211 (Toagosei Co., Ltd); 3-ethyl-3-((2-ethyl-hexyloxy)methyl)-oxetane, such as OXT-212 (Toagosei Co., Ltd); ascorbic acid; methanethiol (methyl mercaptan); ethanethiol (ethyl mercaptan); Coenzyme A; dimercaptosuccinic acid (DMSA); grapefruit mercaptan ((R)-2-(4-methylcyclohex-3-enyl)propane-2-thiol)); cysteine ((R)-2-amino-3-sulfanyl-propanoic acid); lipoamide (1,2-dithiolane-3-pentanamide); 5,7-bis(1,1-dimethylethyl)-3-[2,3 (or 3,4)-dimethylphenyl]-2(3H)-benzofuranone, commercially available from Ciba under the trademark Irganox® HP-136; benzyl phenyl sulfide; diphenyl sulfide; diisopropylamine; dioctadecyl 3,3'-thiodipropionate, commercially available from Ciba under the trademark Irganox® PS 802; didodecyl 3,3'-thiopropionate, commercially available from Ciba under the trademark Irganox® PS 800; di-(2,2,6,6-tetramethyl-4-piperidyl)sebacate, commercially available from Ciba under the trademark Tinuvin® 770; poly-(N-hydroxyethyl-2,2,6,6-tetramethyl-4-hydroxy-piperidyl succinate, commercially available from Ciba under the trademark Tinuvin® 622LD; methyl bis tallow amine; bis tallow amine; phenol-alpha-naphthylamine; bis(dimethylamino)methylsilane (DMAMS); tris(trimethylsilyl)silane (TTMSS); vinyltriethoxysilane; vinyltrimethoxysilane; 2,5-difluorobenzophenone; 2',5'-dihydroxyacetophenone; 2-aminobenzophenone; 2-chlorobenzophenone; benzyl phenyl sulfide; diphenyl sulfide; dibenzyl sulfide; ionic liquids; and others as disclosed in PCT Patent Application Publication No. WO2007/126760 (International Patent Application No. PCT/US07/07477, filed Mar. 26, 2007).

Ionic liquid stabilizers comprise at least one ionic liquid. Ionic liquids are organic salts that are liquid at room temperature (approximately 25° C.). In another embodiment, ionic liquid stabilizers comprise salts containing cations selected from the group consisting of pyridinium, pyridazinium, pyrimidinium, pyrazinium, imidazolium, pyrazolium, thiazolium, oxazolium and triazolium; and anions selected from the group consisting of $[BF_4]-$, $[PF_6]-$, $[SbF_6]-$, $[CF_3SO_3]-$, $[HCF_2CF_2SO_3]-$, $[CF_3HFCCF_2SO_3]-$, $[HCClFCF_2SO_3]-$, $[(CF_3SO_2)_2N]-$, $[(CF_3CF_2SO_2)_2N]-$, $[(CF_3SO_2)_3C]-$, $[CF_3CO_2]-$, and $F-$. Representative ionic liquid stabilizers include emim $BF_4$ (1-ethyl-3-methylimidazolium tetrafluoroborate); bmim $BF_4$ (1-butyl-3-methylimidazolium tetraborate); emim $PF_6$ (1-ethyl-3-methylimidazolium hexafluorophosphate); and bmim $PF_6$ (1-butyl-3-methylimidazolium hexafluorophosphate), all of which are available from Fluka (Sigma-Aldrich).

Heat Transfer System

The present disclosure also provides a closed loop heat transfer system which includes a pressure measuring device for measuring the internal pressure in the system. For exemplification, the present invention is illustrated with respect to a heat transfer system of an automotive vehicle, although this heat transfer system may be useful in both mobile and stationary applications The closed loop heat transfer system of the present invention may be a vapor-compression system. Such a system is shown generally at 10 in FIG. 1. Vapor-compression heat transfer systems typically include an evaporator, a compressor, a condenser, and an expander. A vapor compression system is a closed loop system which re-uses refrigerant in multiple steps producing a cooling effect in one step and a heating effect in a different step. The cycle can be described simply as follows. Liquid heat transfer composition enters an evaporator through an expander, and the liquid heat transfer composition boils in the evaporator at a low temperature to form a gas and produce cooling. The low-pressure gas enters a compressor where the gas is compressed to raise its pressure and temperature. The higher-pressure (compressed) gaseous heat transfer composition then enters the condenser in which the heat transfer composition condenses and discharges its heat to the environment. The heat transfer composition returns to the expander through which the liquid expands from the higher-pressure level in the condenser to the low-pressure level in the evaporator, thus repeating the cycle.

Figure 1:
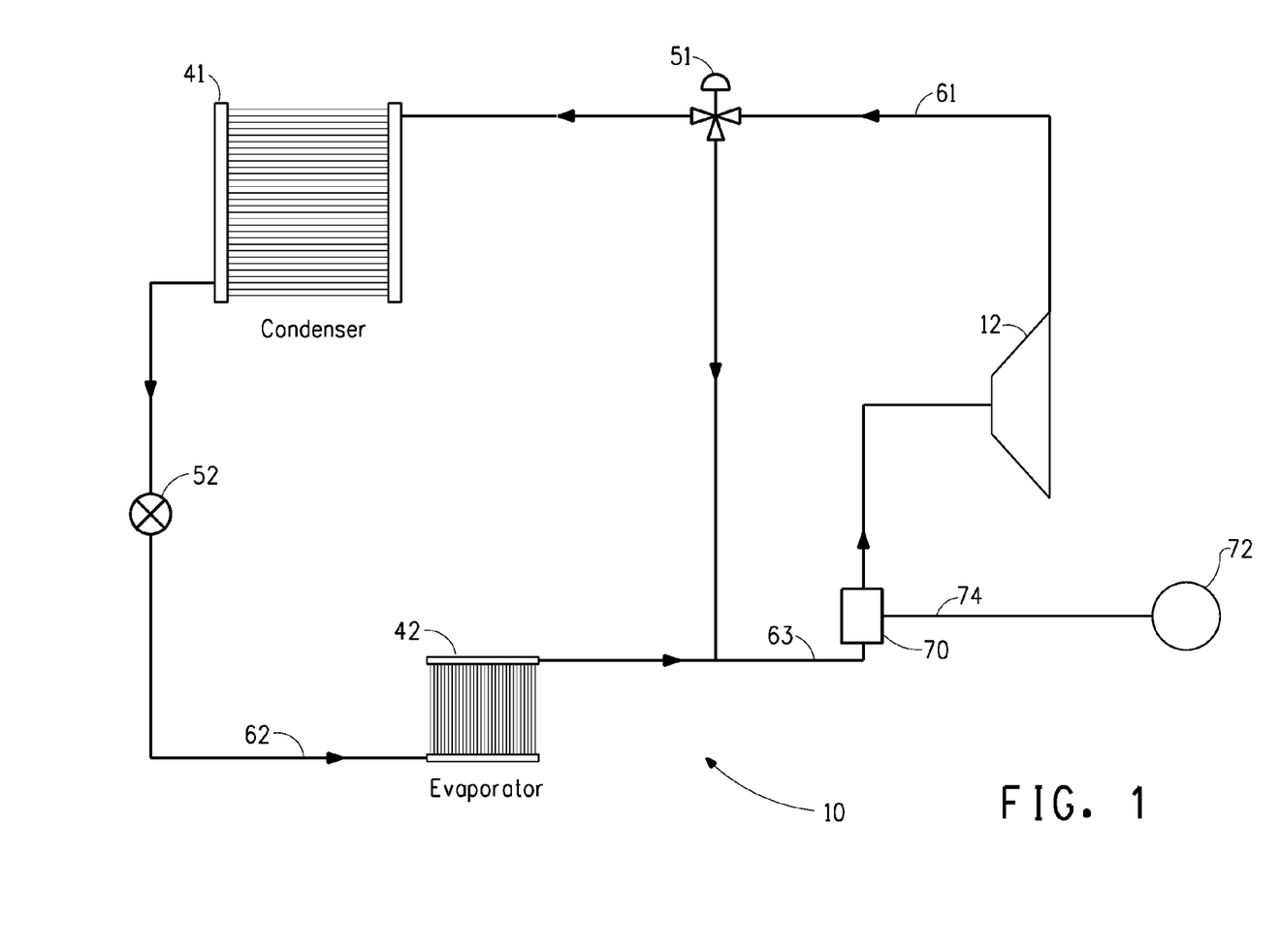
FIG. 1 is a schematic diagram of a heat transfer system including a pressure measurement device in accordance with the present invention.

With reference to FIG. 1, a compressor 12 having an inlet and an outlet is shown. A gaseous heat transfer composition, such as a refrigerant, from an evaporator 42 having an inlet and an outlet, flows from the outlet of the evaporator through a connecting line 63 to the inlet of the compressor, where the gaseous refrigerant is compressed. Various types of compressors may be used with the present invention, including reciprocating, rotary, jet, centrifugal, scroll, screw or axial-flow, depending on the mechanical means to compress the fluid, or as positive-displacement (e.g., reciprocating, scroll or screw) or dynamic (e.g., centrifugal or jet).

The compressed, gaseous heat transfer composition from the compressor flows through the compressor outlet and through a connecting line 61 to a condenser 41. A pressure regulating valve 51 in connecting line 61 may be used. This valve allows recycle of the refrigerant flow back to the compressor via a line 63, thereby providing the ability to control the pressure of the heat transfer composition reaching the condenser 41 and if necessary to prevent compressor surge. The compressed heat transfer composition is condensed in the condenser, thus giving off heat, and is converted to a liquid. The liquid heat transfer composition flows through an expander 52, having an inlet and an outlet. The inlet of the expander is connected to the outlet of the condenser. The outlet of the expander is connected via a line 62 to an evaporator 42, which, in the case of an automobile air-conditioning system, is located in the passenger compartment. In the evaporator, the liquid heat transfer composition is vaporized, providing cooling. The outlet of the evaporator is connected to the inlet of the compressor, and the cycle then repeats. The expander 52 may be an expansion valve, a capillary tube or an orifice tube.

In certain embodiments, the expander may be an expansion valve, capillary tube, orifice tube, or any other device where the heat transfer composition may undergo an abrupt reduction in pressure.

The heat transfer system may optionally contain an internal heat exchanger which exchanges heat from the liquid line exiting the condenser and the suction line entering the compressor. Alternatively, in certain embodiments, the heat transfer systems as disclosed herein may employ fin and tube heat exchangers, microchannel heat exchangers and vertical or horizontal single pass tube or plate type heat exchangers, among others for both the evaporator and condenser.

The closed loop heat transfer system of the present invention further includes a device for measuring the internal pressure of the heat transfer system located within the closed loop system. The pressure measuring device means for measuring internal system pressure may be any known pressure measurement device, and is shown at 70 in FIG. 1. The pressure sensor may actually be within the tubing of the system, as shown at 70. A readout and/or control unit may be connected to the pressure sensor by a line 74 and may be located just external to the pressure sensor in close proximity, as shown at 72, or in a remote location. Such pressure measurement device may be, but are not limited to, sensors such as transducers, barometers, Bourdon gauges, diaphragm gauges, piezo-resistive sensors, micro-electromechanical systems (MEMS), and optical sensors, among others. In some embodiments, the monitoring of pressure may comprise using a sensor, such as a thermocouple, to measure a parameter other than pressure, such as temperature from a thermocouple. These sensors may be used in conjunction with a pressure sensor in order to compensate for variations in these other parameters. In another embodiment sensors such as thermocouples may be used alone to measure temperature, for instance, which may be used to calculate pressure within the system from fundamental relationships. Measurement devices as listed above are available commercially from, for instance Honeywell International, Inc. (Morristown, N.J.) and others.

In the present invention, the pressure measurement device is installed, and may even be permanently installed, inside the closed loop heat transfer system. The measurement device may be hard wired to a unit for control and read-out of the measurement, or may transmit signals in a wireless manner to and from a unit for control and read-out. The pressure measurement device could be installed in the heat transfer system at any location where a change in pressure might be detected. It may be advantageous to have the means for measuring pressure located at any point in the system wherein the heat transfer composition is all or at least mostly vapor (as opposed to being liquid). The evaporator pressure is more constant then the condenser pressure as external conditions change, so the preferred measurement point for the measurement device would be between the evaporator and compressor, as shown in FIG. 1. Alternatively, the measurement device may be installed between the expander and the evaporator, though there may tend to be a vapor-liquid mixture in that location, whereas between the evaporator and compressor it is usually all vapor. Alternatively, the pressure measurement device may be installed between the compressor and the condenser, or between the condenser and the expander.

In certain embodiments, the connecting lines between the components of the heat transfer system, through which the heat transfer composition may flow, may be constructed of any typical conduit material known for such purpose. In one embodiment, metal piping or metal tubing (such as copper or copper alloy tubing) may be used to connect the components of the heat transfer system. In another embodiment, hoses, constructed of various materials, such as polymers or elastomers, or combinations of such materials with reinforcing materials such as metal mesh etc, may be used in the system. One example of a hose design for heat transfer systems, in particular for automobile air conditioning systems, is provided in International Patent Application Publication No. WO2008/027555, published Mar. 6, 2008.

In one embodiment, the heat transfer system may further comprise an indicator connected to the means for measuring internal system pressure that produces a signal informing the user of a leak of heat transfer composition. For instance in an automobile air conditioning system, the indicator may be a light on the dashboard that is displayed when a leak is detected. In another embodiment, the indicator may be an audible alarm or in yet another embodiment, the indicator may be a light and audible alarm in combination. The indicator would provide communication to the user of the leaking heat transfer composition such that repair and recharge may be accomplished prior to excessive material being leaked or loss of cooling capability occurs.

In one embodiment, the present method for detecting leaks may be useful in mobile heat transfer systems, referring to any refrigeration or air conditioning system incorporated into a transportation unit for the road, rail, sea or air. In another embodiment, systems, which are meant to provide refrigeration or air conditioning for a system independent of any moving carrier, known as "intermodal" systems, are included in the present invention. Such intermodal systems include "containers" (combined sea/land transport) as well as "swap bodies" (combined road and rail transport). The present invention is particularly useful for road transport refrigerating or air conditioning systems, such as automobile air conditioning systems or refrigerated road transport equipment.

In another embodiment, the present method for detecting leaks may be useful in stationary heat transfer systems, e.g. air conditioners, heat pumps, chillers, high temperature heat pumps, residential and light commercial and commercial air conditioning systems. Stationary air-conditioning and heat pump applications also include window, ductless, ducted, packaged terminal, chillers and commercial, including packaged rooftop. In stationary refrigeration applications, in yet another embodiment, the present method may be useful for detecting leaks in equipment such as domestic or home refrigerators and freezers, self-contained coolers and freezers, walk-in coolers and freezers, ice machines, and supermarket systems.

Such stationary heat transfer systems may be associated with CHP (Combined Heat and Power) systems, wherein a stationary internal combustion engine is used to drive an electrical generator. The waste heat produced by the engine may be recovered and used to perform work, by such means as a Rankine Cycle (steam engine) or Organic Rankine cycle (ORC). In a Rankine cycle, the heat is used to vaporize a liquid (an organic liquid in the case of an ORC), which in turn drives a turbine. The mechanical energy of the turbine may be used to drive an electricity generator, which runs a heat transfer system.

Method for Detecting Leaks

The present disclosure provides, in one embodiment, a method for detecting leaks in a heat transfer system comprising measuring the pressure of the heat transfer composition inside the heat transfer system at a first time, measuring the pressure of the heat transfer composition at a second time later than the first time, and comparing the pressure measured at the first time with the pressure measured at the second time, wherein a drop in pressure from the first time to the second time indicates a leak.

The measurement device must provide accurate readings in the typical range of pressures found internally in heat transfer systems for situations when heat transfer composition has been initially charged, when the system is operating, when the system is not operating, and when the heat transfer composition is leaking from the system. Typically, the pressure range during these different circumstances would be from zero psi (0 kPa) to about 200 psi (about 1400 kPa).

In one embodiment, the present method for detecting leaks may be useful in mobile heat transfer systems as described above. In another embodiment, intermodal systems as described above are included in the method for detecting leaks of the present invention. In another embodiment, the present method for detecting leaks may be useful in stationary heat transfer systems, as described above

EXAMPLE 1

Pressure Change During Leakage

A vessel is charged to 15% full (corresponding to a typical charge of an automobile air conditioning system) with an initial composition at a temperature of 23° C., and the initial vapor pressure of the composition is measured. The composition is allowed to leak from the vessel, while the temperature is held constant. The vapor pressure of the composition remaining in the vessel is measured at different levels of leakage (as percent of original composition leaked). Vapor pressures are determined at about 13%, 20%, and 30% leakage and are shown in Table 4.

TABLE 4

| Initial Composition | % Leakage | Vapor pressure (psia) |
|---|---|---|
| HFC-1225ye/HFC-32 (95/5 wt %) | 0 (initial) | 87.79 |
|  | 13.8 | 87.32 |
|  | 20 | 84.89 |
|  | 30.1 | 81.19 |
| HFC-1225ye/HFC-134a/HFC-32 (87/8/5 wt %) | 0 (initial) | 89.96 |
|  | 13.9 | 89.54 |
|  | 20 | 87.35 |
|  | 30 | 83.94 |
| HFC-1225ye/HFC-134a/HFC-32 (88/9/3 wt %) | 0 (initial) | 83.45 |
|  | 13.4 | 83.15 |
|  | 20 | 81.6 |
|  | 30 | 79.4 |
| HFC-1225ye/HFC-134a/HFC-32 (88/9/3 wt %) | 0 (initial) | 89.17 |
|  | 13.9 | 88.74 |
|  | 20 | 86.47 |
|  | 30 | 82.95 |

The measurable pressure change indicated in the table provides a means for detecting a leak in a heat transfer system after minimal loss of refrigerant. For comparison, pure HFC-134a, would maintain a constant pressure within a leaking system until most of the charge had leaked.

EXAMPLE 2

Pressure Change During Leakage

A vessel is charged to 90% full with an initial composition at a temperature of 23° C., and the initial vapor pressure of the composition is measured. The composition is allowed to leak from the vessel, while the temperature is held constant. The vapor pressure of the composition remaining in the vessel is measured at different levels of leakage (as percent of original composition leaked). Vapor pressures are determined at about 10%, 20%, and 30% leakage and are shown in Table 5.

TABLE 5

| Initial Composition | % Leakage | Vapor pressure (psia) |
|---|---|---|
| HFC-1234yf/HFC-32/HFC-125 (55/16/29 wt %) | 0 (initial) | 166.6 |
|  | 10 | 163.8 |
|  | 20 | 160.4 |
|  | 30 | 156.5 |
| HFC-1234yf/HFC-125 (70/30 wt %) | 0 (initial) | 117.6 |
|  | 10 | 116.5 |
|  | 20 | 115.2 |
|  | 30 | 113.7 |
| HFC-1234yf/propane (95/5 wt %) | 0 (initial) | 112.3 |
|  | 10 | 110.4 |
|  | 20 | 108.3 |
|  | 30 | 106.2 |
| HFC-1234yf/HFC-125/HFC-134a (50/30/20 wt %) | 0 (initial) | 119.2 |
|  | 10 | 118.2 |
|  | 20 | 117.1 |
|  | 30 | 115.9 |

The measurable pressure change indicated in the table provides a means for detecting a leak in a heat transfer system after minimal loss of refrigerant. For comparison, pure HFC-134a, would maintain a constant pressure within a leaking system until most of the charge had leaked

EXAMPLE 3

Pressure Change During Leakage

A vessel is charged to 90% full with an initial composition at a temperature of 23° C., and the initial vapor pressure of the composition is measured. The composition is allowed to leak from the vessel, while the temperature is held constant. The vapor pressure of the composition remaining in the vessel is measured at different levels of leakage (as percent of original composition leaked). Vapor pressures are determined at about 10%, 20%, and 30% leakage and are shown in Table 5.

TABLE 6

| Initial Composition | % Leakage | Vapor pressure (psia) |
|---|---|---|
| HFC-trans-1234ze/HFC-32/HFC-125 (55/16/29 wt %) | 0 (initial) | 155.9 |
|  | 10 | 152.1 |
|  | 20 | 147.5 |
|  | 30 | 142.1 |
| HFC-trans-1234ze/HFC-125 (70/30 wt %) | 0 (initial) | 108.4 |
|  | 10 | 105.6 |
|  | 20 | 102.3 |
|  | 30 | 98.6 |

TABLE 6-continued

| Initial Composition | % Leakage | Vapor pressure (psia) |
|---|---|---|
| HFC-trans-1234ze/propane (95/5 wt %) | 0 (initial) | 90.9 |
| | 10 | 87.5 |
| | 20 | 83.7 |
| | 30 | 79.9 |
| HFC-trans-1234ze/HFC-125/HFC-134a (50/30/20 wt %) | 0 (initial) | 111.5 |
| | 10 | 109.4 |
| | 20 | 106.9 |
| | 30 | 104.0 |

The measurable pressure change indicated in the table provides a means for detecting a leak in a heat transfer system after minimal loss of refrigerant. For comparison, pure HFC-134a, would maintain a constant pressure within a leaking system until most of the charge had leaked Many aspects and embodiments have been described above and are merely exemplary and not limiting. After reading this specification, skilled artisans appreciate that other aspects and embodiments are possible without departing from the scope of the invention.

What is claimed is:

1. A method for detecting a leak of heat transfer composition in a closed loop heat transfer system, comprising measuring the pressure of the heat transfer composition with a pressure measuring device disposed within said heat transfer system at a first time, and measuring the pressure of the heat transfer composition at a second time later than the first time, and comparing the pressure measured at the first time with the pressure measured at the second time, wherein a drop in pressure from the first time to the second time indicates a leak; wherein said heat transfer composition comprises at least one compound selected from the group consisting of hydrofluorocarbons, fluoroethers, fluoroolefins, hydrocarbons, $CF_3I$, $NH_3$, $CO_2$, and mixtures thereof; provided that said heat transfer composition comprises at least one fluoroolefin selected from the group consisting of:

(i) fluoroolefins of the formula E- or Z—$R^1CH=CHR^2$, wherein $R^1$ and $R^2$ are, independently, $C_1$ to $C_6$ perfluoroalkyl groups, and mixtures thereof;

(ii) cyclic fluoroolefins of the formula cyclo-[CX=CY(CZW)$_n$—], wherein X, Y, Z, and W, independently, are H or F, and n is an integer from 2 to 5, and mixtures thereof; and (iii) fluoroolefins selected from the group consisting of:

1,2,3,3,3-pentafluoro-1-propene (CHF=CFCF$_3$), 1,1,3,3,3-pentafluoro-1-propene (CF$_2$=CHCF$_3$), 1,1,2,3,3-pentafluoro-1-propene (CF$_2$=CFCHF$_2$), 1,2,3,3-tetrafluoro-1-propene (CHF=CFCHF$_2$), 2,3,3,3-tetrafluoro-1-propene (CH$_2$=CFCF$_3$), 1,3,3,3-tetrafluoro-1-propene (CHF=CHCF$_3$), 1,1,2,3-tetrafluoro-1-propene (CF$_2$=CFCH$_2$F), 1,1,3,3-tetrafluoro-1-propene (CF$_2$=CHCHF$_2$), 1,2,3,3-tetrafluoro-1-propene (CHF=CFCHF$_2$), 3,3,3-trifluoro-1-propene (CH$_2$=CHCF$_3$), 2,3,3-trifluoro-1-propene (CHF$_2$CF=CH$_2$); 1,1,2-trifluoro-1-propene (CH$_3$CF=CF$_2$); 1,2,3-trifluoro-1-propene (CH$_2$FCF=CF$_2$); 1,1,3-trifluoro-1-propene (CH$_2$FCH=CF$_2$); 1,3,3-trifluoro-1-propene (CHF$_2$CH=CHF); 1,1,1,2,3,4,4,4-octafluoro-2-butene (CF$_3$CF=CFCF$_3$); 1,1,2,3,3,4,4,4-octafluoro-1-butene (CF$_3$CF$_2$CF=CF$_2$); 1,1,2,3,4,4-heptafluoro-2-butene (CF$_3$CF=CHCF$_3$); 1,2,3,3,4,4,4-heptafluoro-1-butene (CHF=CFCF$_2$CF$_3$); 1,1,1,2,3,4,4-heptafluoro-2-butene (CHF$_2$CF=CFCF$_3$); 1,3,3,3-tetrafluoro-2-(trifluoromethyl)-1-propene ((CF$_3$)$_2$C=CHF); 1,1,3,3,4,4,4-heptafluoro-1-butene (CF$_2$=CHCF$_2$CF$_3$); 1,1,2,3,4,4,4-heptafluoro-1-butene (CF$_2$=CFCHFCF$_3$); 1,1,2,3,3,4,4-heptafluoro-1-butene (CF$_2$=CFCF$_2$CHF$_2$); 2,3,3,4,4,4-hexafluoro-1-butene (CF$_3$CF$_2$CF=CH$_2$); 1,3,3,4,4,4-hexafluoro-1-butene (CHF=CHCF$_2$CF$_3$); 1,2,3,4,4,4-hexafluoro-1-butene (CHF=CFCHFCF$_3$); 1,2,3,3,4,4-hexafluoro-1-butene (CHF=CFCF$_2$CHF$_2$); 1,1,2,3,3,4-hexafluoro-2-butene (CHF$_2$CF=CFCHF$_2$); 1,1,1,2,3,4-hexafluoro-2-butene (CH$_2$FCF=CFCF$_3$); 1,1,1,2,4,4-hexafluoro-2-butene (CHF$_2$CH=CFCF$_3$); 1,1,1,3,4,4-hexafluoro-2-butene (CF$_3$CH=CFCHF$_2$); 1,1,2,3,3,4-hexafluoro-1-butene (CF$_2$=CFCF$_2$CH$_2$F); 1,1,2,3,4,4-hexafluoro-1-butene (CF$_2$=CFCHFCHF$_2$); 3,3,3-trifluoro-2-(trifluoromethyl)-1-propene (CH$_2$=C(CF$_3$)$_2$); 1,1,1,2,4-pentafluoro-2-butene (CH$_2$FCH=CFCF$_3$); 1,1,1,3,4-pentafluoro-2-butene (CF$_3$CH=CFCH$_2$F); 3,3,4,4,4-pentafluoro-1-butene (CF$_3$CF$_2$CH=CH$_2$); 1,1,1,4,4-pentafluoro-2-butene (CHF$_2$CH=CHCF$_3$); 1,1,1,2,3-pentafluoro-2-butene (CH$_3$CF=CFCF$_3$); 2,3,3,4,4-pentafluoro-1-butene (CH$_2$=CFCF$_2$CHF$_2$); 1,1,2,4,4-pentafluoro-2-butene (CHF$_2$CF=CHCHF$_2$); 1,1,2,3,3-pentafluoro-1-butene (CH$_3$CF$_2$CF=CF$_2$); 1,1,2,3,4-pentafluoro-2-butene (CH$_2$FCF=CFCHF$_2$); 1,1,3,3,3-pentafluoro-2-methyl-1-propene (CF$_2$=C(CF$_3$)(CH$_3$)); 2-(difluoromethyl)-3,3,3-trifluoro-1-propene (CH$_2$=C(CHF$_2$)(CF$_3$)); 2,3,4,4,4-pentafluoro-1-butene (CH$_2$=CFCHFCF$_3$); 1,2,4,4,4-pentafluoro-1-butene (CHF=CFCH$_2$CF$_3$); 1,3,4,4,4-pentafluoro-1-butene (CHF=CHCHFCF$_3$); 1,3,3,4,4-pentafluoro-1-butene (CHF=CHCF$_2$CHF$_2$); 1,2,3,4,4-pentafluoro-1-butene (CHF=CFCHFCHF$_2$); 3,3,4,4-tetrafluoro-1-butene (CH$_2$=CHCF$_2$CHF$_2$); 1,1-difluoro-2-(difluoromethyl)-1-propene (CF$_2$=C(CHF$_2$)(CH$_3$)); 1,3,3,3-tetrafluoro-2-methyl-1-propene (CHF=C(CF$_3$)(CH$_3$)); 3,3-difluoro-2-(difluoromethyl)-1-propene (CH$_2$=C(CHF$_2$)$_2$); 1,1,1,2-tetrafluoro-2-butene (CF$_3$CF=CHCH$_3$); 1,1,1,3-tetrafluoro-2-butene (CH$_3$CF=CHCF$_3$); 1,1,1,2,3,4,4,5,5,5-decafluoro-2-pentene (CF$_3$CF=CFCF$_2$CF$_3$); 1,1,2,3,3,4,4,5,5,5-decafluoro-1-pentene (CF$_2$=CFCF$_2$CF$_2$CF$_3$); 1,1,1,4,4,4-hexafluoro-2-(trifluoromethyl)-2-butene ((CF$_3$)$_2$C=CHCF$_3$); 1,1,1,2,4,4,5,5,5-nonafluoro-2-pentene (CF$_3$CF=CHCF$_2$CF$_3$); 1,1,1,3,4,4,5,5,5-nonafluoro-2-pentene (CF$_3$CH=CFCF$_2$CF$_3$); 1,2,3,3,4,4,5,5,5-nonafluoro-1-pentene (CHF=CFCF$_2$CF$_2$CF$_3$); 1,1,3,3,4,4,5,5,5-nonafluoro-1-pentene (CF$_2$=CHCF$_2$CF$_2$CF$_3$); 1,1,2,3,3,4,4,5,5-nonafluoro-1-pentene (CF$_2$=CFCF$_2$CF$_2$CHF$_2$); 1,1,2,3,4,4,5,5,5-nonafluoro-2-pentene (CHF$_2$CF=CFCF$_2$CF$_3$); 1,1,1,2,3,4,4,5,5-nonafluoro-2-pentene (CF$_3$CF=CFCF$_2$CHF$_2$); 1,1,1,2,3,4,5,5,5-nonafluoro-2-pentene (CF$_3$CF=CFCHFCF$_3$); 1,2,3,4,4,4-hexafluoro-3-(trifluoromethyl)-1-butene (CHF=CFCF(CF$_3$)$_2$); 1,1,2,4,4,4-hexafluoro-3-(trifluoromethyl)-1-butene (CF$_2$=CFCH(CF$_3$)$_2$); 1,1,1,4,4,4-hexafluoro-2-(trifluoromethyl)-2-butene (CF$_3$CH=C(CF$_3$)$_2$); 1,1,3,4,4,4-hexafluoro-3-(trifluoromethyl)-1-butene (CF$_2$=CHCF(CF$_3$)$_2$); 2,3,3,4,4,5,5,5-octafluoro-1-pentene (CH$_2$=CFCF$_2$CF$_2$CF$_3$); 1,2,3,3,4,4,5,5-octafluoro-1-pentene (CHF=CFCF$_2$CF$_2$CHF$_2$); 3,3,4,4,4-pentafluoro-2-(trifluoromethyl)-1-butene (CH$_2$=C(CF$_3$)CF$_2$CF$_3$); 1,1,4,4,4-pentafluoro-3-(trifluoromethyl)-1-butene (CF$_2$=CHCH(CF$_3$)$_2$); 1,3,4,4,4-pentafluoro-3-(trifluoromethyl)-1-butene (CHF=CHCF(CF$_3$)$_2$); 1,1,4,4,4-pentafluoro-2-(trifluoromethyl)-1-butene (CF$_2$=C(CF$_3$)CH$_2$CF$_3$); 3,4,4,4-tetrafluoro-3-(trifluoromethyl)-1-butene ((CF$_3$)$_2$CFCH=CH$_2$); 3,3,4,4,5,5,5-heptafluoro-1-pentene (CF$_3$CF$_2$CF$_2$CH=CH$_2$); 2,3,3,4,4,5,5-heptafluoro-1-pentene (CH$_2$=CFCF$_2$CF$_2$CHF$_2$); 1,1,3,3,5,5,5-heptafluoro-1-butene (CF$_2$=CHCF$_2$CH$_2$CF$_3$); 1,1,1,2,4,4,4-heptafluoro-3-methyl-2-butene (CF$_3$CF=C(CF$_3$)(CH$_3$)); 2,4,4,4-tetrafluoro-3-(trifluoromethyl)-1-butene (CH$_2$=CFCH(CF$_3$)$_2$); 1,4,4,4-tetrafluoro-3-(trifluoromethyl)-1-butene (CHF=CHCH(CF$_3$)$_2$); 1,1,1,4-tetrafluoro-2-(trifluoromethyl)-2-butene (CH$_2$FCH=C(CF$_3$)$_2$); 1,1,1,3-tetrafluoro-2-(trifluoromethyl)-2-butene (CH$_3$CF=C(CF$_3$)$_2$); 1,1,1-trifluoro-2-(trifluoromethyl)-2-butene ((CF$_3$)$_2$C=CHCH$_3$); 3,4,4,5,5,5-hexafluoro-2-pentene (CF$_3$CF$_2$CF=CHCH$_3$); 1,1,1,4,4,4-hexafluoro-2-methyl-2-butene (CF$_3$C(CH$_3$)=CHCF$_3$); 3,3,4,5,5,5-hexafluoro-1-pentene (CH$_2$=CHCF$_2$CHFCF$_3$); 4,4,4-trifluoro-2-(trifluoromethyl)-1-butene (CH$_2$=C(CF$_3$)CH$_2$CF$_3$); 1,1,2,3,3,4,4,5,5,6,6,6-dodecafluoro-1-hexene (CF$_3$(CF$_2$)$_3$CF=CF$_2$); 1,1,1,2,2,3,4,5,5,6,6,6-dodecafluoro-3-hexene (CF$_3$CF$_2$CF=CFCF$_2$CF$_3$); 1,1,1,4,4,4-hexafluoro-2,3-bis(trifluoromethyl)-2-butene ((CF$_3$)$_2$C=C(CF$_3$)$_2$); 1,1,1,2,3,4,5,5,5-nonafluoro-4-(trifluoromethyl)-2-pentene ((CF$_3$)$_2$CFCF=CFCF$_3$); 1,1,1,4,4,5,5,5-octafluoro-2-(trifluoromethyl)-2-pentene ((CF$_3$)$_2$C=CHC$_2$F$_5$); 1,1,1,3,4,5,5,5-octafluoro-4-(trifluoromethyl)-2-pentene ((CF$_3$)$_2$CFCF=CHCF$_3$); 3,3,4,4,5,5,6,6,6-nonafluoro-1-hexene (CF$_3$CF$_2$CF$_2$CF$_2$CH=CH$_2$); 4,4,4-trifluoro-3,3-bis(trifluoromethyl)-1-butene (CH$_2$=CHC(CF$_3$)$_3$); 1,1,1,4,4,4-hexafluoro-3-methyl-2-(trifluoromethyl)-2-butene ((CF$_3$)$_2$C=C(CH$_3$)(CF$_3$)); 2,3,3,5,5,5-hexafluoro-4-(trifluoromethyl)-1-pentene (CH$_2$=CFCF$_2$CH(CF$_3$)$_2$); 1,1,1,2,4,4,5,5,5-nonafluoro-3-methyl-2-pentene (CF$_3$CF=C(CH$_3$)CF$_2$CF$_3$); 1,1,1,5,5,5-hexafluoro-4-(trifluoromethyl)-2-pentene (CF$_3$CH=CHCH(CF$_3$)$_2$); 3,4,4,5,5,6,6,6-octafluoro-2-hexene (CF$_3$CF$_2$CF$_2$CF=CHCH$_3$); 3,3,4,4,5,5,6,6-octafluoro1-hexene (CH$_2$=CHCF$_2$CF$_2$CF$_2$CHF$_2$); 1,1,1,4,4-pentafluoro-2-(trifluoromethyl)-2-pentene ((CF$_3$)$_2$C=CHCF$_2$CH$_3$); 4,4,5,5,5-pentafluoro-2-(trifluoromethyl)-1-pentene (CH$_2$=C(CF$_3$)CH$_2$C$_2$F$_5$); 3,3,4,4,5,5,5-heptafluoro-2-methyl-1-pentene (CF$_3$CF$_2$CF$_2$C(CH$_3$)=CH$_2$); 4,4,5,5,6,6,6-heptafluoro-2-hexene (CF$_3$CF$_2$CF$_2$CH=CHCH$_3$); 4,4,5,5,6,6,6-heptafluoro-1-hexene (CH$_2$=CHCH$_2$CF$_2$C$_2$F$_5$); 1,1,1,2,2,3,4-heptafluoro-3-hexene (CF$_3$CF$_2$CF=CFC$_2$H$_5$); 4,5,5,5-tetrafluoro-4-(trifluoromethyl)-1-pentene (CH$_2$=CHCH$_2$CF(CF$_3$)$_2$); 1,1,1,2,5,5,5-heptafluoro-4-methyl-2-pentene (CF$_3$CF=CNCH(CF$_3$)(CH$_3$)); 1,1,1,3-tetrafluoro-2-(trifluoromethyl)-2-pentene ((CF$_3$)$_2$C=CFC$_2$H$_5$); 1,1,1,2,3,4,4,5,5,6,6,7,7,7-tetradecafluoro-2-heptene (CF$_3$CF=CFCF$_2$CF$_2$C$_2$F$_5$); 1,1,1,2,2,3,4,5,5,6,6,7,7,7-tetradecafluoro-3-heptene (CF$_3$CF$_2$CF=CFCF$_2$C$_2$F$_5$); 1,1,1,3,4,4,5,5,6,6,7,7,7-tridecafluoro-2-heptene (CF$_3$CH=CFCF$_2$CF$_2$C$_2$F$_5$); 1,1,1,2,4,4,5,5,6,6,7,7,7-tridecafluoro-2-heptene (CF$_3$CF=CHCF$_2$CF$_2$C$_2$F$_5$); 1,1,1,2,2,4,5,5,6,6,7,7,7-tridecafluoro-3-heptene (CF$_3$CF$_2$CH=CFCF$_2$C$_2$F$_5$); 1,1,1,2,2,3,5,5,6,6,7,7,7-tridecafluoro-3-heptene (CF$_3$CF$_2$CF=CHCF$_2$C$_2$F$_5$); pentafluoroethyl trifluorovinyl ether (CF$_2$=CFOCF$_2$CF$_3$); and trifluoromethyl trifluorovinyl ether (CF$_2$=CFOCF$_3$); and mixtures thereof;

and wherein said fluoroolefin can be any mixture of any compounds from (i), (ii), and (iii) above.

2. The method of claim 1, wherein said heat transfer composition comprises at least one compound from the group consisting of HFC-32, HFC-125, HFC-134a, HFC-152a, HFC-161, and mixtures thereof.

3. The method of claim 1, wherein said heat transfer composition comprises at least one compound from the group consisting of HFC-1225ye, HFC-1234yf, HFC-1234ze, HFC-1243zf, and mixtures thereof.

4. The method of claim 1, wherein said heat transfer composition comprises a mixture selected from the group consisting of:
HFC-32 and HFC-1225ye;
HFC-1234yf and CF$_3$I;
HFC-32, HFC-134a, and HFC-1225ye;
HFC-32, HFC-1225ye, and HFC-1234yf;
HFC-125, HFC-1225ye, and HFC-1234yf;
HFC-32, HFC-1225ye, HFC-1234yf, and CF$_3$I;
HFC-134a, HFC-1225ye, and HFC-1234yf;
HFC-134a and HFC-1234yf;
HFC-125 and HFC-1234yf;
HFC-32, HFC-125, and HFC-1225ye;
HFC-32 and HFC-1234yf;
HFC-32, HFC-125, and HFC-1234yf;
HFC-32, HFC-134a, and HFC-1234yf;
HFC-32, HFC-125, HFC-134a, and HFC-1234yf;
dimethylether and HFC-1234yf;
HFC-152a and HFC-1234yf;
HFC-152a, HFC-134a, and HFC-1234yf;
HFC-152a, n-butane, and HFC-1234yf;
HFC-134a, propane, and HFC-1234yf;
HFC-125, HFC-152a, and HFC-1234yf;
HFC-125, HFC-134a, and HFC-1234yf;
HFC-32, HFC-1234ze, and HFC-1234yf;
HFC-125, HFC-1234ze, and HFC-1234yf;
HFC-32, HFC-1234ze, HFC-1234yf, and CF$_3$I;
HFC-134a, HFC-1234ze, and HFC-1234yf;
HFC-134a and HFC-1234ze;
HFC-32 and HFC-1234ze;
HFC-125 and HFC-1234ze;
HFC-32, HFC-125, and HFC-1234ze;
HFC-32, HFC-134a, and HFC-1234ze;
dimethylether and HFC-1234ze;
HFC-152a and HFC-1234ze;
HFC-152a, HFC-134a, and HFC-1234ze;
HFC-152a, n-butane, and HFC-1234ze;
HFC-134a, propane, and HFC-1234ze;
HFC-125, HFC-152a, and HFC-1234ze; and
HFC-125, HFC-134a, and HFC-1234ze.

5. The method of claim 1, wherein the internal pressure is measured by a pressure sensor installed inside the system.

6. The method of claim 1, wherein the closed loop heat transfer system comprises:
(a) a compressor for compressing a gaseous heat transfer composition, the compressor having an inlet and an outlet;

(b) a condenser for condensing the gaseous heat transfer composition to a liquid, the condenser having an inlet and an outlet, where the inlet is connected via a connecting line to the outlet of the compressor;

(c) an expander for expanding the liquid heat transfer composition having an inlet and an outlet, where the inlet is connected via a connecting line to the outlet of the condenser;

(d) an evaporator for vaporizing the expanded, liquid heat transfer composition having an inlet and an outlet, where the inlet is connected via a connecting line to the expander and the outlet is connected to the inlet of the compressor via a connecting line; and (e) means for measuring the internal pressure of the heat transfer system disposed inside the heat transfer system.

7. The method of claim 6, wherein the internal pressure measuring means is disposed in the connecting line between the evaporator and the compressor.

8. The method of claim 1 wherein said heat transfer composition comprises a non-azeotropic composition.

9. The method of claim 1, wherein said heat transfer composition comprises at least one hydrofluorocarbon and at least one fluoroolefin.

10. The method of claim 9 wherein said heat transfer composition comprises at least one hydrofluorocarbon selected from the group consisting of fluoromethane ($CH_3F$, HFC-41), difluoromethane ($CH_2F_2$, HFC-32), trifluoromethane ($CHF_3$, HFC-23), pentafluoroethane ($CF_3CHF_2$, HFC-125), 1,1,2,2-tetrafluoroethane ($CHF_2CHF_2$, HFC-134), 1,1,1,2-tetrafluoroethane ($CF_3CH_2F$, HFC-134a), 1,1,1-trifluoroethane ($CF_3CH_3$, HFC-143a), 1,1-difluoroethane ($CHF_2CH_3$, HFC-152a), fluoroethane ($CH_3CH_2F$, HFC-161), 1,1,1,2,2,3,3-heptafluoropropane ($CF_3CF_2CHF_2$, HFC-227ca), 1,1,1,2,3,3,3-heptafluoropropane ($CF_3CHFCF_3$, HFC-227ea), 1,1,2,2,3,3,-hexafluoropropane ($CHF_2CF_2CHF_2$, HFC-236ca), 1,1,1,2,2,3-hexafluoropropane ($CF_3CF_3CH_2F$, HFC-236cb), 1,1,1,2,3,3-hexafluoropropane ($CF_3CHFCHF_2$, HFC-236ea), 1,1,1,3,3,3-hexafluoropropane ($CF_3CH_2CF_3$, HFC-236fa), 1,1,2,2,3-pentafluoropropane ($CHF_2CF_2CH_2F$, HFC-245ca), 1,1,1,2,2-pentafluoropropane ($CF_3CF_2CH_3$, HFC-245cb), 1,1,2,3,3-pentafluoropropane ($CHF_2CHFCHF_2$, HFC-245ea), 1,1,1,2,3-pentafluoropropane ($CF_3CHFCH_2F$, HFC-245eb), 1,1,1,3,3-pentafluoropropane ($CF_3CH_2CHF_2$, HFC-245fa), 1,2,2,3-tetrafluoropropane ($CH_2FCF_2CH_2F$, HFC-254ca), 1,1,2,2-tetrafluoropropane ($CHF_2CF_2CH_3$, HFC-254cb), 1,1,2,3-tetrafluoropropane ($CHF_2CHFCH_2F$, HFC-254ea), 1,1,1,2-tetrafluoropropane ($CF_3CHFCH_3$, HFC-254eb), 1,1,3,3-tetrafluoropropane ($CHF_2CH_2CHF_2$, HFC-254fa), 1,1,1,3-tetrafluoropropane ($CF_3CH_2CH_2F$, HFC-254fb), 1,1,1-trifluoropropane ($CF_3CH_2CH_3$, HFC-263fb), 2,2-difluoropropane ($CH_3CF_2CH_3$, HFC-272ca), 1,2-difluoropropane ($CH_2FCHFCH_3$, HFC-272ea), 1,3-difluoropropane ($CH_2FCH_2CH_2F$, HFC-272fa), 1,1-difluoropropane ($CHF_2CH_2CH_3$, HFC-272fb), 2-fluoropropane ($CH_3CHFCH_3$, HFC-281ea), 1-fluoropropane ($CH_2FCH_2CH_3$, HFC-281fa), 1,1,2,2,3,3,4,4-octafluorobutane ($CHF_2CF_2CF_2CHF_2$, HFC-338pcc), 1,1,1,2,2,4,4,4-octafluorobutane ($CF_3CH_2CF_2CF_3$, HFC-338mf), 1,1,1,3,3-pentafluorobutane ($CF_3CH_2CHF_2$, HFC-365mfc), 1,1,1,2,3,4,4,5,5,5-decafluoropentane ($CF_3CHFCHFCF_2CF_3$, HFC-43-10mee), and 1,1,1,2,2,3,4,5,5,6,6,7,7,7-tetradecafluoroheptane ($CF_3CF_2CHFCHFCF_2CF_2CF_3$, HFC-63-14mee).

11. The method of claim 9, wherein said heat transfer composition comprises HFC-134a and HFC-1234yf.

12. The method of claim 9, wherein said hydrofluorocarbon component consists essentially of HFC-134a and said fluoroolefin component consists essentially of HFC-1234yf.

13. The method of claim 9, wherein said heat transfer composition comprises HFC-32 and HFC-1234yf.

14. The method of claim 9, wherein said hydrofluorocarbon component consists essentially of HFC-32 and said fluoroolefin component consists essentially of HFC-1234yf.

15. The method of claim 1, wherein said fluoroolefin is selected from the group consisting of:

1,1,1,4,4,4-hexafluorobut-2-ene; 1,1,1,4,4,5,5,5-octafluoropent-2-ene; 1,1,1,4,4,5,5,6,6,6-decafluorohex-2-ene; 1,1,1,4,5,5,5-heptafluoro-4-(trifluoromethyl)pent-2-ene; 1,1,1,2,2,5,5,6,6,6-decafluorohex-3-ene; 1,1,1,4,4,5,5,6,6,7,7,7-dodecafluorohept-2-ene; 1,1,1,4,4,5,6,6,6-nonafluoro-5-(trifluoromethyl)hex-2-ene; 1,1,1,4,5,5,6,6,6-nonfluoro-4-(trifluoromethyl)hex-2-ene; 1,1,1,5,5,5-hexafluoro-4,4-bis(trifluoromethyl)pent-2-ene; 1,1,1,2,2,5,5,6,6,7,7,7-dodecafluorohept-3-ene; 1,1,1,2,2,5,6,6,6-nonafluoro-5-(trifluoromethyl)hex-3-ene; 1,1,1,4,4,5,5,6,6,7,7,8,8,8-tetradecafluorooct-2-ene; 1,1,1,4,4,5,5,6,7,7,7-undecafluoro-6-(trifluoromethyl)hept-2-ene; 1,1,1,5,5,6,6,6-octafluoro-4,4-bis(trifluoromethyl)hex-2-ene; 1,1,1,2,2,5,5,6,6,7,7,8,8,8-tetradecafluorooct-3-ene; 1,1,1,2,2,5,5,6,7,7,7-undecafluoro-6-(trifluoromethyl)hept-3-ene; 1,1,1,2,2,5,6,6,7,7,7-undecafluoro-5-(trifluoromethyl)hept-3-ene; 1,1,1,2,2,6,6,6-octafluoro-5,5-bis(trifluoromethyl)hex-3-ene; 1,1,1,2,2,3,3,6,6,7,7,8,8,8-tetradecafluorooct-4-ene; 1,1,1,2,5,6,6,6-octafluoro-2,5-bis(trifluoromethyl)hex-3-ene; 1,1,1,2,5,5,6,6,7,7,7-undecafluoro-2-(trifluoromethyl)hept-3-ene; 1,1,1,4,4,5,5,6,6,7,7,8,8,9,9,9-hexadecafluoronon-2-ene; 1,1,1,4,5,5,6,6,7,7,8,8,8-tridecafluoro-4-(trifluoromethyl)hept-2-ene; 1,1,1,6,6,6-octafluoro-4,4-bis(trifluoromethyl)hept-2-ene; 1,1,1,2,2,5,5,6,6,7,7,8,8,9,9,9-hexadecafluoronon-3-ene; 1,1,1,2,2,5,5,6,6,7,8,8,8-tridecafluoro-7-(trifluoromethyl)oct-3-ene; 1,1,1,2,2,6,6,7,7,7-decafluoro-5,5-bis(trifluoromethyl)hept-3-ene; 1,1,1,2,2,3,3,6,6,7,7,8,8,9,9,9-hexadecafluoronon-4-ene; 1,1,1,2,2,3,3,6,6,7,8,8,8-tridecafluoro-7-(trifluoromethyl)oct-4-ene; 1,1,1,2,2,3,3,6,7,7,8,8,8-tridecafluoro-6-(trifluoromethyl)oct-4-ene; 1,1,1,5,5,6,6,7,7,7-decafluoro-2,2-bis(trifluoromethyl)hept-3-ene; 1,1,1,2,5,5,6,6,7,7,8,8,8-tridecafluoro-2(trifluoromethyl)oct-3-ene; 1,1,1,2,5,5,6,7,7,7-decafluoro-2,6-bis(trifluoromethyl)hept-3-ene; 1,1,1,2,5,6,6,7,7,7-decafluoro-2,5-bis(trifluoromethyl)hept-3-ene; 1,1,1,2,6,6,6-heptafluoro-2,5,5-tris(trifluoromethyl)hex-3-ene; 1,1,1,2,2,5,5,6,6,7,7,8,8,9,9,10,10,10-octadecafluorodec-3-ene; 1,1,1,2,2,5,6,6,7,7,8,8,9,9,9-pentadecafluoro-5-(trifluoromethyl)non-3-ene; 1,1,1,2,2,6,6,7,7,8,8-dodecafluoro-5,5-bis(trifluoromethyl)oct-3-ene; 1,1,1,2,2,3,3,6,6,7,7,8,8,9,9,10,10,10-octadecafluorodec-4-ene; 1,1,1,2,2,3,3,6,6,7,8,9,9,9-pentadecafluoro-8-(trifluoromethyl)non-4-ene; 1,1,1,2,2,3,3,7,7,8,8-dodecafluoro-6,6-bis(trifluoromethyl)oct-4-ene; 1,1,1,2,5,5,6,6,7,7,8,9,9,9-pentadecafluoro-2-(trifluoromethyl)non-3-ene; 1,1,1,2,5,5,6,6,7,8,8,8-dodecafluoro-2,7-bis(trifluoromethyl)oct-3-ene; 1,1,1,2,6,6,7,7,7-nonafluoro-2,5,5-tris(trifluoromethyl)hept-3-ene; 1,1,1,2,2,3,3,4,4,7,7,8,8,9,9,10,10,10-octadecafluorodec-5-ene; 1,1,1,2,3,3,6,6,7,7,8,8,9,9,9-pentadecafluoro-2-(trifluoromethyl)non-4-ene; 1,1,1,2,2,3,6,6,7,7,8,8,9,9,9-pentadecafluoro-3-(trifluoromethyl)non-4-ene; 1,1,1,5,5,6,6,7,7,8,8,8-dodecafluoro-2,2,-bis(trifluoromethyl)oct-3-ene; 1,1,1,2,3,3,6,6,7,8,8,8- dodecafluoro-2,7-bis(trifluoromethyl)oct-4-ene; 1,1,1,2,3,3,6,7,7,8,8,8-dodecafluoro-2,6-bis(trifluoromethyl)oct-4-ene; 1,1,1,5,5,6,7,7,7-nonafluoro-2,2,6-tris(trifluoromethyl)hept-3-ene; 1,1,1,2,2,3,6,7,7,8,8,8-dodecafluoro-3,6-bis(trifluoromethyl)oct-4-ene; 1,1,1,5,6,6,7,7,7-nonafluoro-2,2,5-tris(trifluoromethyl)hept-3-ene; 1,1,1,6,6,6-hexafluoro-2,2,5,5-tetrakis(trifluoromethyl)hex-3-ene, 1,2,3,3,4,4-hexafluorocyclobutene; 3,3,4,4-tetrafluorocyclobutene; 3,3,4,4,5,5,-hexafluorocyclopentene; 1,2,3,3,4,4,5,5-octafluorocyclopentene; and 1,2,3,3,4,4,5,5,6,6-decafluorocyclohexene.

* * * * *